United States Patent
Fukuda et al.

(10) Patent No.: US 11,595,772 B2
(45) Date of Patent: Feb. 28, 2023

(54) INFORMATION PROCESSING DEVICE, INFORMATION PROCESSING METHOD, AND INFORMATION PROCESSING PROGRAM

(71) Applicant: Sony Group Corporation, Tokyo (JP)

(72) Inventors: Kazumi Fukuda, Tokyo (JP); Tetsu Magariyachi, Kanagawa (JP)

(73) Assignee: Sony Group Corporation, Tokyo (JP)

( * ) Notice: Subject to any disclaimer, the term of this patent is extended or adjusted under 35 U.S.C. 154(b) by 0 days.

(21) Appl. No.: 17/282,705

(22) PCT Filed: Oct. 3, 2019

(86) PCT No.: PCT/JP2019/039103
§ 371 (c)(1),
(2) Date: Apr. 2, 2021

(87) PCT Pub. No.: WO2020/075622
PCT Pub. Date: Apr. 16, 2020

(65) Prior Publication Data
US 2021/0385600 A1   Dec. 9, 2021

(30) Foreign Application Priority Data
Oct. 10, 2018   (JP) .............................. JP2018-191513

(51) Int. Cl.
*H04S 3/00*       (2006.01)
*H04R 5/033*     (2006.01)
*H04S 7/00*       (2006.01)

(52) U.S. Cl.
CPC ............. *H04S 3/004* (2013.01); *H04R 5/033* (2013.01); *H04S 7/301* (2013.01); *H04S 2420/01* (2013.01)

(58) Field of Classification Search
CPC ..... H04R 5/033; H04S 2420/01; H04S 3/004; H04S 7/301
(Continued)

(56) References Cited

U.S. PATENT DOCUMENTS 6,996,244 B1   2/2006 Slaney et al.
9,544,706 B1   1/2017 Hirst
(Continued)

FOREIGN PATENT DOCUMENTS

CN    1901761 A    1/2007
CN    103139677 A    6/2013
(Continued)

OTHER PUBLICATIONS

Kaneko, Shoken (The Acoustical Society of Japan, Meeting Report (Spring, 2017), "Estimating ear solid shape from ear photographs by statistical ear shape modeling and deep learning and HRTF personalization"), pp. 449-452 (English Translation pp. 1-5)) (Year: 2017).*

(Continued)

*Primary Examiner* — Paul Kim
(74) *Attorney, Agent, or Firm* — Wolf, Greenfield & Sacks, P.C.

(57) ABSTRACT

An information processing device (100) according to the present disclosure includes: an acquisition unit (141) configured to acquire a first image including a content image of an ear of a user; and a calculation unit (142) configured to calculate, based on the first image acquired by the acquisition unit (141), a head-related transfer function corresponding to the user by using a learned model having learned to output a head-related transfer function corresponding to an ear when an image including a content image of the ear is input.

16 Claims, 17 Drawing Sheets

(58) Field of Classification Search
USPC .......................................................... 381/309
See application file for complete search history.

(56) References Cited

U.S. PATENT DOCUMENTS

| | | |
|---|---|---|
| 10,038,966 B1 | 7/2018 | Mehra |
| 10,341,803 B1 | 7/2019 | Mehra |
| 2006/0067548 A1* | 3/2006 | Slaney .................. H04S 1/002 381/303 |
| 2007/0019812 A1 | 1/2007 | Kim |
| 2013/0169779 A1 | 7/2013 | Pedersen |
| 2018/0132764 A1 | 5/2018 | Jain |
| 2018/0373957 A1 | 12/2018 | Lee et al. |
| 2019/0014431 A1 | 1/2019 | Lee et al. |
| 2022/0027033 A1 | 1/2022 | Okimoto et al. |

FOREIGN PATENT DOCUMENTS

| | | |
|---|---|---|
| EP | 2611216 A1 | 7/2013 |
| EP | 3 351 172 A1 | 7/2018 |
| JP | H1083190 A | 3/1998 |
| JP | 2004314915 A | 11/2004 |
| JP | 2013-168924 A | 8/2013 |
| WO | WO 2017/116308 A1 | 7/2017 |

OTHER PUBLICATIONS

International Written Opinion and English translation thereof dated Nov. 26, 2019 in connection with International Application No. PCT/JP2019/039103.

International Preliminary Report on Patentability and English translation thereof dated Apr. 22, 2021 in connection with International Application No. PCT/JP2019/039103.

Chun et al., Deep Neural Network Based HRTF Personalization Using Anthropometric Measurements. AES 143rd Convention, Oct. 18-21, 2017. New York, NY, USA. 5 pages.

Kaneko et al., DeepEarNet: Individualizing Spatial Audio with Photography, Ear Shape Modeling, and Neural Networks. Conference Paper: 2016 AES International Conference on Audio for Virtual and Augmented Reality. Sep. 2016 (Sep. 30-Oct. 1, 2016). Los Angeles, CA, USA. Xp040681039, 9 pages.

Torres-Gallegos et al., Personalization of head-related transfer functions (HRTF) based on automatic photo-anthropometry and inference from a database. Applied Acoustics, Elsevier Publishing, GB. Oct. 2015, v97; pp. 84-95.

Yao et al., Head-Related Transfer Function Selection Using Neural Networks. Archives of Acoustics. Apr. 2017, v 42(3); pp. 365-373.

International Search Report and English translation thereof dated Nov. 26, 2019 in connection with International Application No. PCT/JP2019/039103.

Kaneko et al., Ear Three-Dimensional Shape Estimation and HRTF Individuation from Ear Photographs using Statistical Ear Shape Modeling and Deep Learning. Reports of the 2017 Spring Meeting the Acoustical Society of Japan CD-ROM. Mar. 2017. pp. 449-452. 10 pages.

* cited by examiner

FIG.4

| EAR PARA-METER | EAR 3D MODEL DATA | HEAD 3D MODEL DATA | EAR IMAGE ID | IMAGE GENERATION PARAMETER ||||
|---|---|---|---|---|---|---|---|
| | | | | TEXTURE | CAMERA ANGLE | RESOLU-TION | LUMINANCE |
| ⋮ | ⋮ | ⋮ | ⋮ | ⋮ | ⋮ | ⋮ | ⋮ |
| A01 | B01 | C01 | D01 | E01 | F01 | G01 | H01 |
| | | | D02 | E02 | F02 | G02 | H02 |
| | | | D03 | E03 | F03 | G03 | H03 |
| ⋮ | ⋮ | ⋮ | ⋮ | ⋮ | ⋮ | ⋮ | ⋮ |

123

INFORMATION PROCESSING DEVICE, INFORMATION PROCESSING METHOD, AND INFORMATION PROCESSING PROGRAM

CROSS-REFERENCE TO RELATED APPLICATIONS

This is a U.S. National Stage Application under 35 U.S.C. § 371, based on International Application No. PCT/JP2019/039103, filed in the Japanese Patent Office as a Receiving Office on Oct. 3, 2019, entitled "INFORMATION PROCESSING DEVICE, INFORMATION PROCESSING METHOD, AND INFORMATION PROCESSING PROGRAM", which claims priority under 35 U.S.C. § 119(a)-(d) or 35 U.S.C. § 365(b) to Japanese Patent Application Number JP2018-191513, filed in the Japanese Patent Office on Oct. 10, 2018, each of which applications is hereby incorporated by reference in its entirety.

FIELD

The present disclosure relates to an information processing device, an information processing method, and an information processing program. Specifically, the present disclosure relates to a head-related transfer function calculation processing.

BACKGROUND

A technology of stereoscopically reproducing an audio image at a headphone or the like by using a head-related transfer function (hereinafter also referred to as an HRTF) that mathematically expresses how sound travels from a sound source to an ear has been used.

The head-related transfer function largely differs among individuals, and thus it is desirable to use a head-related transfer function generated for each individual when the head-related transfer function is used. For example, a technology of generating a three-dimensional digital model (hereinafter referred to as a "3D model") of a head based on an image obtained by capturing an auricle of a user, and calculating a head-related transfer function of the user based on the generated 3D model has been known.

CITATION LIST

Patent Literature

Patent Literature 1: U.S. Pat. No. 9,544,706

SUMMARY

Technical Problem

According to a conventional technology, it is possible to use, in information processing, a head-related transfer function individually calculated in accordance with each user, thereby increasing stationary of an audio image.

However, the above-described conventional technology generates a 3D digital model based on an image captured by a user and calculates a head-related transfer function based on the generated model, and thus has a relatively large calculation processing load. Thus, it is presumed that, with the above-described conventional technology, a long time is needed until a head-related transfer function is provided to a user having transmitted an image, and accordingly, convenience is not high.

Thus, the present disclosure provides an information processing device, an information processing method, and an information processing program that can improve user convenience in processing related to a head-related transfer function.

Solution to Problem

To solve the above problem, an information processing device according to an embodiment of the present disclosure includes: an acquisition unit configured to acquire a first image including a content image of an ear of a user; and a calculation unit configured to calculate, based on the first image acquired by the acquisition unit, a head-related transfer function corresponding to the user by using a learned model having learned to output a head-related transfer function corresponding to an ear when an image including a content image of the ear is input.

BRIEF DESCRIPTION OF DRAWINGS

FIG. 4 is a diagram illustrating an exemplary ear image storage unit according to the present disclosure.

DESCRIPTION OF EMBODIMENTS

Embodiments of the present disclosure will be described below in detail with reference to the accompanying drawings. Note that identical sites in the embodiments are denoted by an identical reference sign, and duplicate description thereof is omitted.

1. First Embodiment

[1-1. Outline of Information Processing According to First Embodiment]

Figure 1:
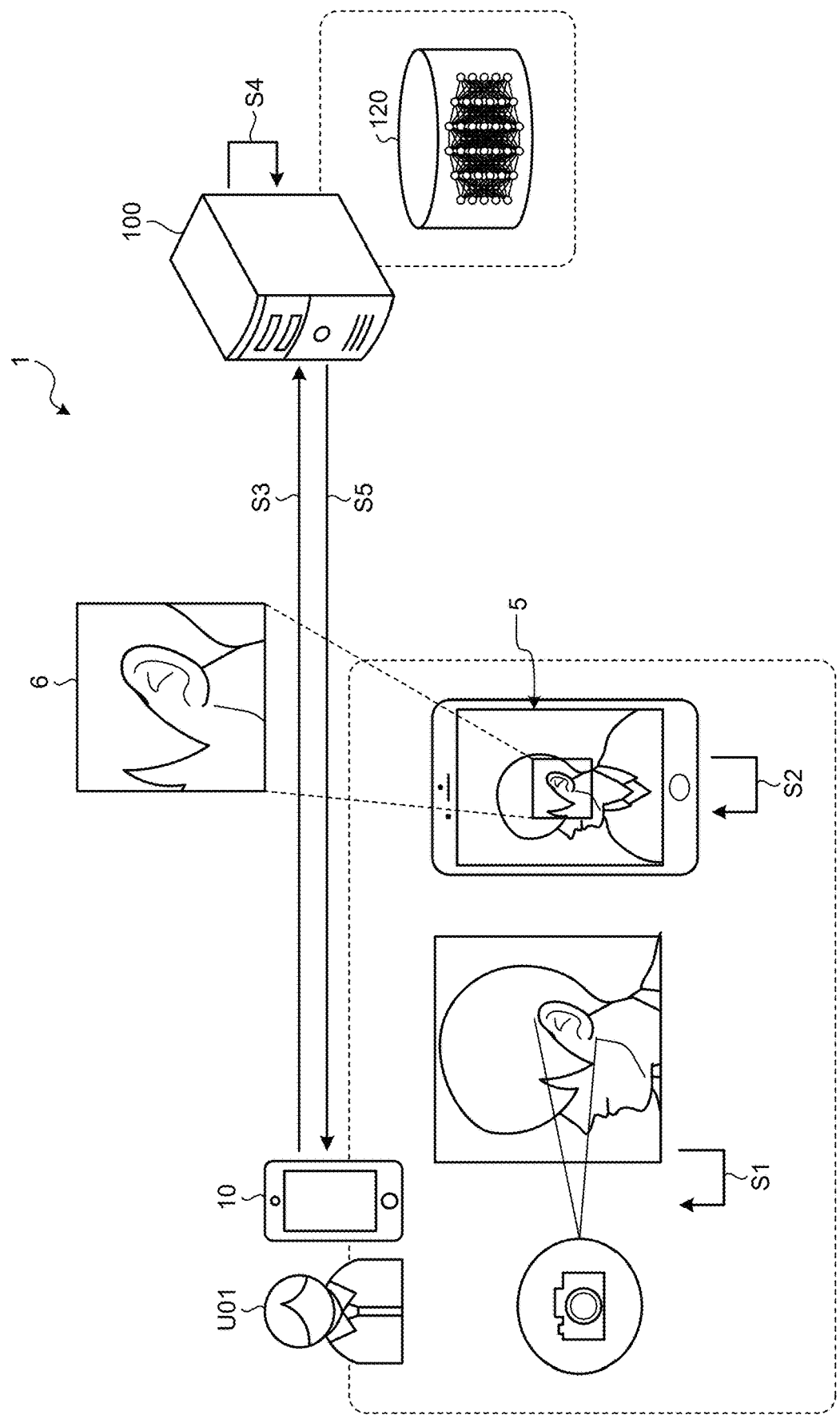
FIG. 1 is a diagram illustrating an overview of information processing according to a first embodiment of the present disclosure.

First, the configuration of an information processing system 1 according to the present disclosure and an outline of information processing executed by the information processing system 1 will be described with reference to FIG. 1. FIG. 1 is a diagram illustrating an outline of information processing according to a first embodiment of the present disclosure. The information processing according to the first embodiment of the present disclosure is achieved by the information processing system 1 illustrated in FIG. 1. The information processing system 1 includes an information processing device 100 and a user terminal 10. The information processing device 100 and the user terminal 10 perform mutual communication through a wired or wireless network (not illustrated). Note that the number of devices of each kind included in the information processing system 1 is not limited to that illustrated.

The information processing device 100 is an exemplary information processing device according to the present disclosure calculates a head-related transfer function (HRTF) corresponding to each user and provides the calculated HRTF. The information processing device 100 is achieved by, for example, a server device.

The user terminal 10 is an information processing terminal used by a user desired to receive HRTF provision. The user terminal 10 is achieved by, for example, a smartphone having an image capturing function. In the example illustrated in FIG. 1, the user terminal 10 is used by a user U01 as an exemplary user.

An HRTF expresses, as a transfer function, sound change caused by a nearby object including the shape of an auricle (ear conch) of or the head of a person. Typically, measurement data for calculating an HRTF is acquired by measuring an acoustic signal for measurement by using a microphone mounted in an auricle of a person, a dummy head microphone, or the like.

For example, an HRTF used in a technology such as a 3D acoustic technology is often calculated by using measurement data acquired by a dummy head microphone or the like, an average value of measurement data acquired from a large number of people, or the like. However, the HRTFs of individuals largely different from each other, and thus it is desirable to use the own HRTF of a user to achieve a more effective acoustic rending effect. Specifically, it is possible to provide acoustic experience with a more realistic sensation to a user by replacing a typical HRTF with the HRTF of the user.

However, measurement of the HRTF of an individual user has various kinds of problems. For example, relatively highly dense measurement data is needed to obtain an HRTF that provides an excellent acoustic effect. Measurement data of acoustic signals output to a user at various angles around the user is needed to acquire highly dense measurement data. Such measurement needs a long time and thus a physical burden on the user is large. In addition, accurate measurement needs to be performed in an anechoic room or the like, and thus an economic burden is large as well. Thus, for example, reduction of a burden on a user and reduction of measurement cost are problems in HRTF calculation.

As for the above-described problems, there is a technology of expressing an ear or the head of a user in a 3D model and performing pseudo measurement through acoustic simulation with the 3D model. With the technology, the user can perform calculation of an HRTF by providing scanning data of the head or a captured image of the head without performing actual measurement in a measurement room.

However, a calculation processing load is extremely large for processing of generating a 3D model and acoustic simulation with the 3D model. Thus, a time lag of several ten minutes or several hours potentially occurs when the above-described technology is used to incorporate an HRTF unique to a user on software or the like that uses, for example, 3D acoustic. This is not highly convenient for the user. Accordingly, processing speed in HRTF calculation needs to be improved to achieve effective use of an HRTF by a user, which is another problem.

As described above, there are various kinds of problems with obtaining an HRTF corresponding to an individual user. The information processing device 100 according to the present disclosure solves the above-described problems through the information processing of the present disclosure.

Specifically, the information processing device 100 calculates an HRTF corresponding to a user by using a learned model (hereinafter simply referred to as a "model") having learned to output an HRTF corresponding to an ear when an image including a content image of the ear is input. For example, when having acquired an image including a content image of an ear of the user U01 from the user terminal 10, the information processing device 100 calculates an HRTF unique to the user U01 by inputting the image into the model. Specifically, the information processing device 100 calculates an HRTF not through the process of generating a 3D model based on the image of the user U01 and performing acoustic simulation.

Accordingly, the information processing device 100 can perform HRTF calculation in an extremely short time as compared to a case in which acoustic simulation is executed. The outline of the information processing executed by the information processing device 100 according to the present disclosure will be described below with reference to FIG. 1 along the process thereof.

As illustrated in FIG. 1, the user U01 performs image capturing of the user from a side of the head to acquire an image including a content image of an ear of the user, (step S1). For example, the user U01 performs image capturing of the head of the user by using a camera owned by the user terminal 10. Note that in the present disclosure, an image of an ear is not limited to a typical two-dimensional color image that can be captured by the user terminal 10 or the like but may be a monochrome image, a depth image including depth information, or an optional combination thereof. The number of images used in the processing of the present disclosure is not limited to one but may be two or more.

The user terminal 10 executes, on an image 5 obtained at step S1, preprocessing for transmission to the information processing device 100 (step S2). Specifically, the user terminal 10 performs, as the preprocessing, processing of detecting a content image of an ear of the user U01 included in the image 5 and cutting out the range of the detected ear content image from the image 5. Note that details of the preprocessing such as ear detection, will be described later.

Through the preprocessing, the user terminal 10 generates an image 6 including a content image of an ear of the user U01. Then, the user terminal 10 transmits the image 6 to the information processing device 100 (step S3). Note that a series of pieces of processing such as the processing of producing the image 6 from the image 5 obtained by image capturing and the processing of transmitting the image 6 are executed by, for example, a computer program (for example, a smartphone application) provided by the information processing device 100. In this manner, in the information processing according to the present disclosure, only the image 6 obtained by cutting out only the ear content image from the image 5 is transmitted to a network, but the image 5 with which the user is potentially specified is not transmitted, and thus processing that is excellent in security can be achieved. In addition, the information processing device 100 does not acquire the image 5 but acquires only the image 6, thereby avoiding the risk of handling private information. Note that the information processing device 100 may perform processing of acquiring the image 5 from the user terminal 10 and producing the image 6 on the information processing device 100 side. This configuration will be described later as a second embodiment.

The information processing device 100 acquires the image 6 transmitted from the user terminal 10. Then, the information processing device 100 inputs the image 6 to a model stored in a storage unit 120 (step S4). This model is a model having learned to output an HRTF corresponding to an ear when a two-dimensional image including a content image of the ear is input. Specifically, the information processing device 100 calculates an HRTF corresponding to the ear (in other words, the user U01) included in the image 6 by inputting the image 6 to the model.

Then, the information processing device 100 provides the calculated HRTF to the user terminal 10 (step S5). In this manner, the user U01 can obtain an HRTF unique to the user without actual measurement processing, 3D model acoustic simulation, nor the like by only preparing the image 5 through image capturing of a side face of the user. Accordingly, the information processing device 100 can provide an HRTF to the user U01 in an extremely short time without causing a measurement burden on the user U01. As a result, the information processing device 100 can achieve improved convenience for a user in processing related to an HRTF.

As described above, in the information processing according to the present disclosure, an HRTF is calculated by using a model generated through learning processing, thereby achieving speeding-up of the processing. Although the outline of the processing of providing an HRTF to the user U01 in the information processing according to the present disclosure is described with reference to FIG. 1, a series of information processes performed by the information processing device 100, which include model learning processing will be described below in detail with reference to FIG. 2 and the following diagrams. Note that a "model" described with reference to FIG. 1 is not necessarily one model but may be a combination of a plurality of models that output various kinds of values, details of which will be described with reference to FIG. 2 and the following diagrams.

[1-2. Entire Process of Information Processing According to the Present Disclosure]

Figure 2:
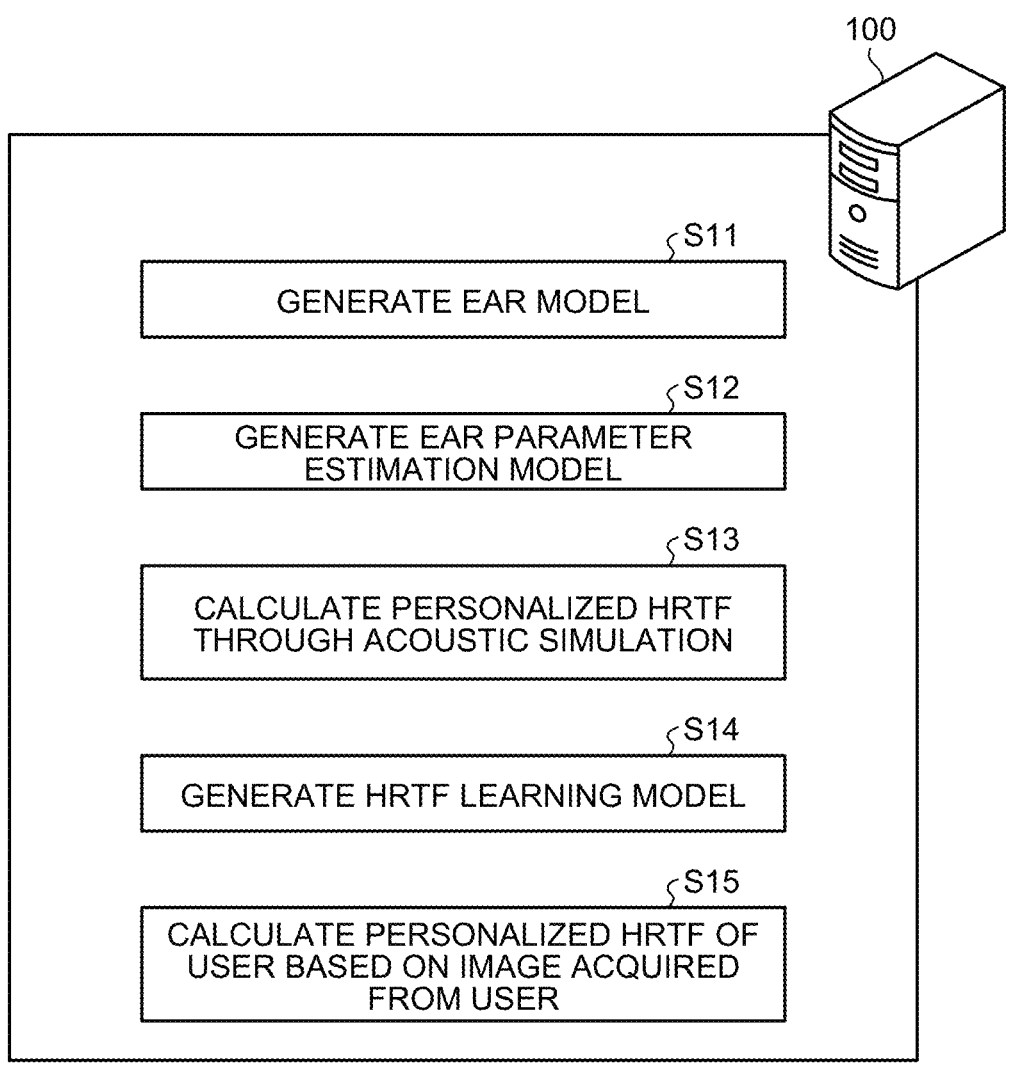
FIG. 2 is a conceptual diagram illustrating the entire process of information processing according to the present disclosure.

Before describing details of such as the configuration of the information processing device 100, the entire process of the information processing executed by the information processing device 100 according to the present disclosure is illustrated in FIG. 2. FIG. 2 is a conceptual diagram illustrating the entire process of the information processing according to the present disclosure.

First, the information processing device 100 collects data related to ear forms of a plurality of persons and generates an ear model based on the collected ear forms (step S11). Note that an ear form is not necessarily limited to plaster or the like shaped in an ear of a person but may be any information indicating the shape of an ear of a person. In the present disclosure, an ear model is a model that outputs a corresponding ear shape when a parameter (hereinafter referred to as an "ear parameter") indicating a characteristic of an ear is input. An ear parameter can be obtained by, for example, performing principal component analysis on the shape of an ear based on data (for example, data obtained from a collected ear form by computed tomography (CT) scanning) related to the shape of the ear. Accordingly, once an ear parameter is obtained, the information processing device 100 can obtain data of the shape of an ear corresponding to the ear parameter (in other words, a 3D model representing the ear).

Thereafter, the information processing device 100 generates an ear parameter estimation model based on the ear model (step S12). The information processing device 100 can generate a large number of ear images by inputting ear parameters to the ear model generated at step S11. An ear parameter may be input at random, or an ear parameter may be automatically generated based on an optional rule (for example, when the fact that particular tendency in the ear shape exists for each particular race is found, a rule may be derived based on this fact), and the generated value may be input. Thus, the information processing device 100 can generate a model that outputs an ear parameter corresponding to an ear when an image including the ear is input by learning the relation between each generated ear image and the ear parameter based on which generation is performed. This model is an ear parameter estimation model. Accordingly, once a two-dimensional image including a content image of an ear is obtained, the information processing device 100 can obtain an ear parameter corresponding to the ear. Then, once the ear parameter is obtained, the information processing device 100 can obtain a 3D model of the ear included in the image by using the ear model generated at step S11. Note that, in the above-described learning, the relation between an image obtained by capturing an ear of a person, the shape of the ear being represented by data, and an ear parameter converted from the data of the ear may be learned. In this case, learning using an actual captured image, not a computer graphics (CG) image, is performed, and thus it is assumed that the accuracy of a generated ear parameter estimation model can be increased.

The information processing device 100 performs acoustic simulation for the 3D model generated by using the ear parameter estimation model and calculates a unique HRTF (hereinafter, such an HRTF generated for an individual ear form is referred to as a "personalized HRTF") corresponding to the 3D model (step S13). Accordingly, through the processes at steps S11 to S13, the information processing device 100 can achieve a series of pieces of processing for calculating a personalized HRTF from an image including an ear by performing acoustic simulation.

In addition, the information processing device 100 generates a large number of 3D models based on randomly or regularly generated ear parameters and repeats processing of performing acoustic simulation for the generated 3D models, thereby learning the relation between an ear parameter and a personalized HRTF. Accordingly, the information processing device 100 generates an HRTF learning model based on the calculated personalized HRTF (step S14).

In the present disclosure, an HRTF learning model is a model that outputs, when an ear parameter is input, a personalized HRTF corresponding to the ear parameter. Accordingly, once an ear parameter is obtained, the information processing device 100 can obtain a personalized HRTF corresponding to the ear parameter.

Thereafter, when having acquired an image from the user, the information processing device 100 calculates the personalized HRTF of the user by inputting the image (more accurately, an ear parameter of an ear included in the image) to the HRTF learning model (step S15). The processing indicated at step S15 corresponds to the series of pieces of processing illustrated in FIG. 1.

As described above, the information processing device 100 generates a plurality of models and performs information processing using the generated models, thereby calculating a personalized HRTF based on an image acquired from a user. Note that the pieces of processing illustrated in FIG. 2 do not necessarily need to be executed in the order of steps S11 to S15. For example, the information processing device 100 only needs to perform the processing at step S15 after generating each model necessary for processing.

This concludes the description of the outline of the entire process of the information processing according to the present disclosure. The configurations of the information processing device 100 and the user terminal 10 as well as details of various kinds of learning processing will be sequentially described with reference to FIG. 3 and the following diagrams.

[1-3. Configuration of Information Processing Device According to First Embodiment]

Figure 3:
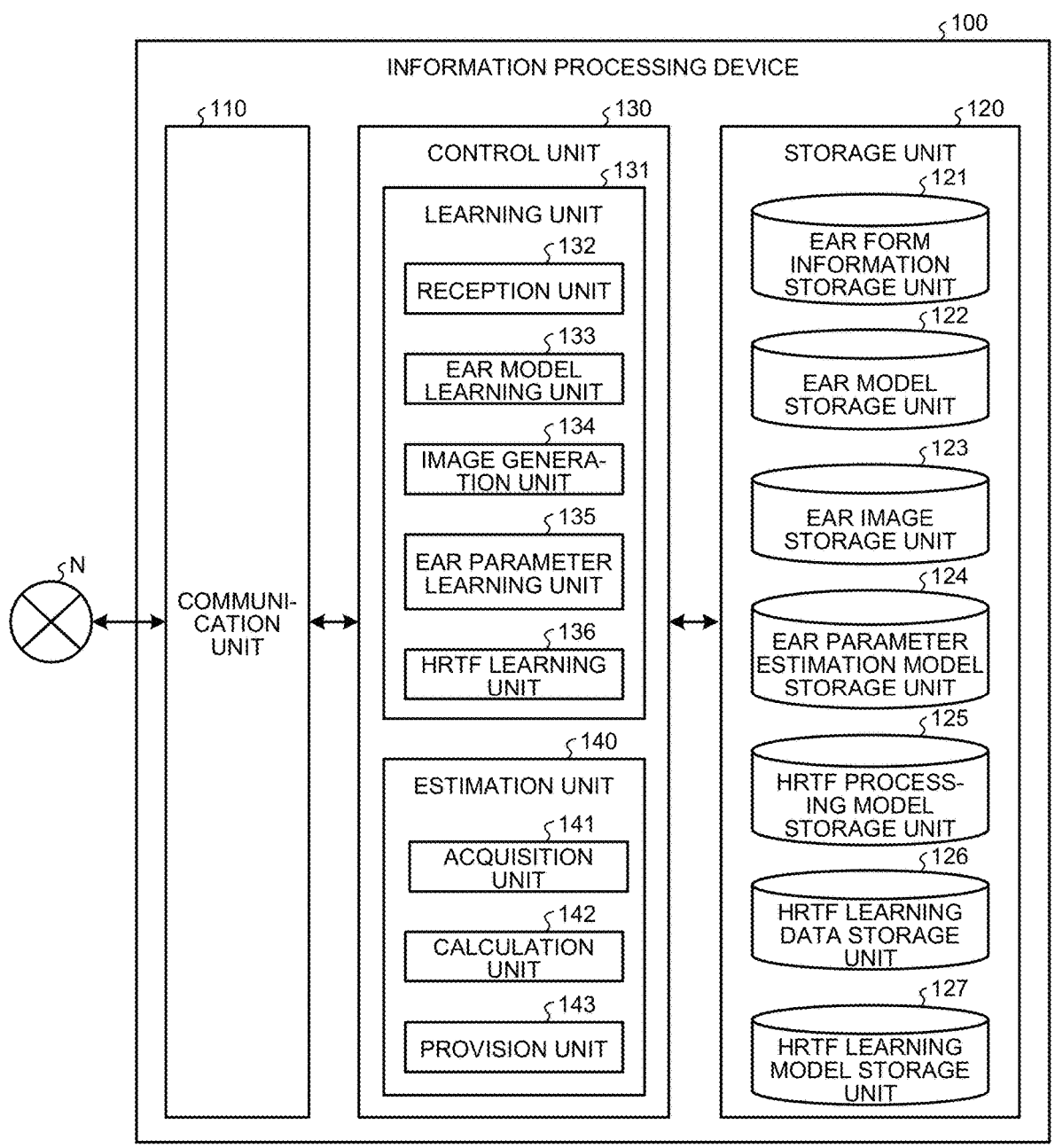
FIG. 3 is a diagram illustrating an exemplary configuration of an information processing device according to the first embodiment of the present disclosure.

The configuration of the information processing device 100 according to the first embodiment will be described below with reference to FIG. 3. FIG. 3 is a diagram illustrating an exemplary configuration of the information processing device 100 according to the first embodiment of the present disclosure.

As illustrated in FIG. 3, the information processing device 100 includes a communication unit 110, the storage unit 120, and a control unit 130. Note that the information processing device 100 may include an input unit (for example, a keyboard or a mouse) configured to receive various operations from an administrator or the like who manages the information processing device 100, and a display unit (for example, a liquid crystal display) for displaying various kinds of information.

The communication unit 110 is achieved by, for example, a network interface card (NIC). The communication unit 110 is connected with a network N (such as the Internet) in a wired or wireless manner and transmits and receives information to and from the user terminal 10 or the like through the network N.

The storage unit 120 is achieved by a storage device, for example, a semiconductor memory element such as a random access memory (RAM) or a flash memory, a hard disk, or an optical disk. The storage unit 120 stores various kinds of data used for learning processing, and a model or the like generated by learning processing.

As illustrated in FIG. 3, the storage unit 120 includes an ear form information storage unit 121, an ear model storage unit 122, an ear image storage unit 123, an ear parameter estimation model storage unit 124, an HRTF processing model storage unit 125, an HRTF learning data storage unit 126, and an HRTF learning model storage unit 127.

The ear form information storage unit 121 stores information of 3D model data generated from an ear form actually collected from a human body (in other words, information related to the shape of an ear). Specifically, the ear form information storage unit 121 stores data (such as a 3D polygon) representing a three-dimensional shape and obtained by performing CT scanning of the collected ear form.

The ear model storage unit 122 stores an ear model according to the present disclosure. An ear model is a model that outputs, when an ear parameter indicating a characteristic of an ear is input, a corresponding ear shape.

An ear parameter can be obtained by performing principal component analysis on data indicating the shape of an ear form stored in the ear form information storage unit 121. Specifically, an ear parameter is obtained by quantifying a site that largely changes in an ear (characterizes the shape of the ear) by performing statistical analysis (principal component analysis) on a 3D polygon of the ear. An ear parameter according to the present disclosure is indicated as, for example, a combination of 10 numbers, and each number is indicated as, for example, a number in the range of minus 10 to plus 10. For example, an ear parameter for which all numbers are "0" corresponds to an ear having an average shape of learning data (collected ear forms). Note that the information processing device 100 may apply, as appropriate, a known technology used in, for example, processing of generating the face of a person to the processing of generating a model indicating the shape of an ear by principal component analysis. The information processing device 100 is not limited to principal component analysis but may generate an ear parameter by using a known analysis method such as independent component analysis or any other non-linear model as appropriate. An ear parameter is not limited to that obtained quantifying a site that largely changes in an ear but may be, for example, that obtained by parameterizing a characteristic related to the shape of an ear so that influence on an HRTF is large.

The ear image storage unit 123 stores an image including a content image of an ear. For example, the ear image storage unit 123 stores, as an ear image, a CG image obtained by rendering the shape of an ear (3D model of the ear) generated by an ear model. The ear image storage unit 123 may store, as an ear image, an image including a content image of an ear, which is transmitted from the user.

FIG. 4 illustrates an exemplary ear image storage unit 123 according to the present disclosure. FIG. 4 is a diagram illustrating an exemplary ear image storage unit 123 of the present disclosure. In the example illustrated in FIG. 4, the ear image storage unit 123 has the items of "ear parameter", "ear 3D model data", "head 3D model data", "ear image ID", and "image generation parameter". The "image generation parameter" has the sub-items of "texture", "camera angle", "resolution", and "luminance".

The "ear parameter" is a parameter indicating a characteristic of the shape of an ear. For example, the ear parameter is expressed by a ten-dimensional number. The "ear 3D model data" is data indicating the three-dimensional shape of an ear reconstructed based on an ear parameter. The "head 3D model data" is data indicating the three-dimensional shape of a head and synthesized with the ear 3D model data at reconstruction of a 3D model of a person.

The "ear image ID" indicates identification information that identifies an ear image obtained by rendering a 3D model. As illustrated in FIG. 4, a plurality of ear images are generated from one 3D model by changing, in various manners, a parameter (image generation parameter) set at rendering.

The "image generation parameter" indicates a set parameter in rendering for generating an image. The "texture"

indicates a setting of CG texture. The "camera angle" indicates the image capturing angle of a pseudo camera when a two-dimensional image is obtained by rendering a 3D model. The "resolution" indicates the resolution of rendering. The "luminance" indicates the luminance of rendering. The item of luminance may include setting data such as the angle of light (incident light) at rendering.

Note that although data of each item is conceptually written as, for example, "A01" or "B01" in FIG. 4, specific data corresponding to the item is stored as data of the item in reality. For example, a specific string of 10 numbers is stored in the item of "ear parameter". This is same for the other items, and various numerical values and kinds of information corresponding to each item are stored in each item.

Specifically, in the example illustrated in FIG. 4, it is indicated that ear 3D model data generated by ear parameter "A01" is "B01" and head 3D model data combined with this ear 3D model data and included in a 3D model of a person is "C01". In addition, it is indicated that ear images obtained from a generated 3D model of a person are a plurality of ear images identified by ear images ID "D01", "D02", "D03", and the like. In addition, it is indicated that, for an ear image identified by ear image ID "D01", the texture is "E01", the camera angle is "F01", the resolution is "G01", and the luminance is "H01" as image generation parameters at rendering.

Description continues with reference to FIG. 3 again. The ear parameter estimation model storage unit 124 stores an ear parameter estimation model. An ear parameter estimation model is a model that outputs, when a two-dimensional image including a content image of an ear is input, an ear parameter corresponding to the ear.

The HRTF processing model storage unit 125 stores an HRTF processing model. Although described later in detail, an HRTF processing model performs processing of compressing the amount of information of an HRTF calculated by acoustic simulation or the like. Note that in the following description, an HRTF compressed by an HRTF processing model is also referred to as an HRTF parameter.

The HRTF learning data storage unit 126 stores learning data for generating a model (HRTF learning model to be described later) for calculating an HRTF from an image including a content image of an ear. Specifically, the HRTF learning data storage unit 126 stores, as learning data, data in which an ear parameter indicating the shape of an ear and an HRTF corresponding to the shape of the ear specified based on the ear parameter are combined.

The HRTF learning model storage unit 127 stores an HRTF learning model. An HRTF learning model is a model that outputs, when an image including a content image of an ear is input, an HRTF corresponding to the ear. For example, when an image including a content image of an ear is acquired, an HRTF learning model uses an ear parameter estimation model to output an ear parameter corresponding to the ear, and in addition, outputs an HRTF corresponding to the ear parameter.

The control unit 130 is achieved by, for example, a central processing unit (CPU) or a micro processing unit (MPU) executing, by using a random access memory (RAM) or the like as a work area, a computer program (for example, an information processing program according to the present disclosure) stored in the information processing device 100. The control unit 130 is a controller and may be achieved by, for example, an integrated circuit such as an application specific integrated circuit (ASIC) or a field programmable gate array (FPGA).

As illustrated in FIG. 3, the control unit 130 includes a learning unit 131 and an estimation unit 140. The learning unit 131 includes a reception unit 132, an ear model learning unit 133, an image generation unit 134, an ear parameter learning unit 135, and an HRTF learning unit 136 and achieves or executes functions and effects of information processing described below. The estimation unit 140 includes an acquisition unit 141, a calculation unit 142, and a provision unit 143 and achieves or executes the functions and effects of the information processing described below. Note that the internal configuration of the control unit 130 is not limited to the configuration illustrated in FIG. 3 but may be any configuration with which the information processing to be described later is performed.

The learning unit 131 will be first described below. The learning unit 131 performs learning processing related to various kinds of data and generates various models to be used by the estimation unit 140.

Note that the learning unit 131 performs learning for generating a model based on various kinds of data, but learning processing described below is exemplary, and the type of learning processing executed by the learning unit 131 is not specified to any type. For example, the learning unit 131 may generate a model by using various learning algorithms such as a neural network, a support vector machine, clustering, and reinforcement learning.

The reception unit 132 receives various kinds of information. For example, the reception unit 132 receives CT scanning data of an ear form collected from a human body. The reception unit 132 stores the received data in the ear form information storage unit 121.

The ear model learning unit 133 generates an ear model by performing learning processing related to the ear model. The ear model learning unit 133 stores the generated ear model in the ear model storage unit 122.

Figure 5:
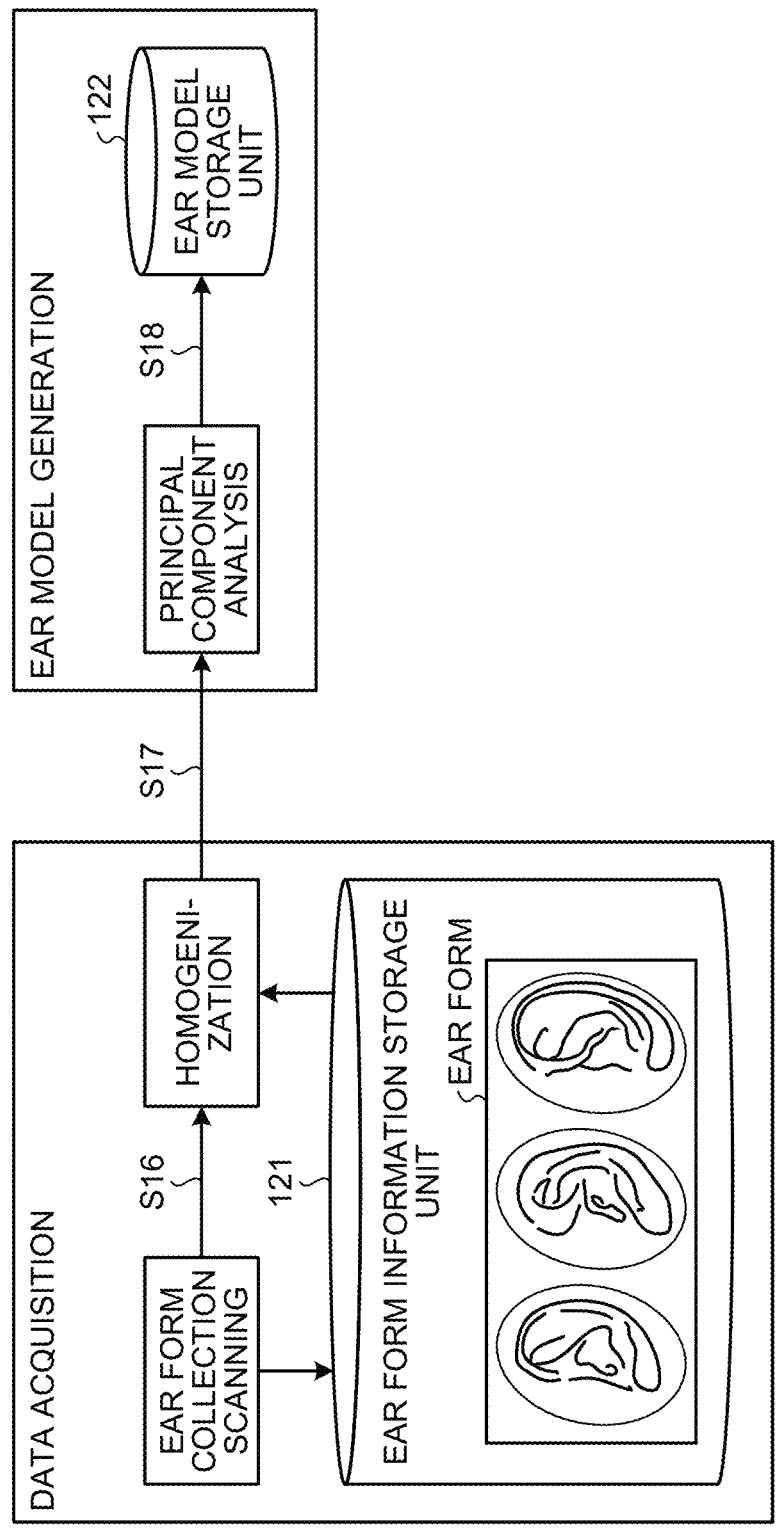
FIG. 5 is a diagram illustrating exemplary learning processing related to an ear model according to the present disclosure.

Exemplary learning processing executed by the reception unit 132 and the ear model learning unit 133 will be described below with reference to FIG. 5. FIG. 5 is a diagram illustrating exemplary learning processing related to an ear model according to the present disclosure.

As illustrated in FIG. 5, the reception unit 132 receives data that is collected from an ear form and scanned, and stores the received data in the ear form information storage unit 121. In addition, the reception unit 132 transfers the received data to the ear model learning unit 133 (step S16).

The ear model learning unit 133 homogenizes the acquired ear form data and generates homogenized data of the ear form (step S17). The homogenization is unification of the number of apexes and the configuration of polygons of a 3D model with those of a reference 3D model. In this case, it is needed to pay attention not to have shape change through the homogenization. In addition, the ear model learning unit 133 performs principal component analysis on the homogenized data (step S18). Accordingly, the ear model learning unit 133 generates a model (ear model) that calculates, from the shape of an ear, an ear parameter indicating the shape of the ear. The ear model learning unit 133 stores the generated ear model in the ear model storage unit 122.

Description continues with reference to FIG. 3 again. The image generation unit 134 generates an image including a content image of an ear. For example, the image generation unit 134 randomly generates an ear parameter and generates the 3D model of an ear by inputting the generated ear parameter to an ear model. In addition, the image generation unit 134 randomly generates parameters (hereinafter referred to as "image generation parameters") such as the texture (for example, skin color) of the generated 3D model, the rendering quality (such as image quality) thereof, and the camera angle thereof at CG rendering. Then, the image generation unit 134 performs rendering with combination of the generated 3D model and the plurality of image generation parameters as appropriate, thereby generating CG images among which the ear shape, the skin color, and the like are different in various manners.

In estimation processing to be described later, an image transmitted from a user is used for the processing, and it is assumed that the skin color of the user, the angle of an ear at image capturing, and the like are highly likely to be different in various manners among images transmitted from the user. Thus, in the processing, it is needed to accurately perform image recognition of a content image of an ear in various images transmitted from the user, which is a problem. The image generation unit 134 generates a large number of images corresponding to various situations as described above to improve the accuracy of image recognition, thereby solving the above-described problem.

The ear parameter learning unit 135 generates an ear parameter estimation model by learning the relation between an image including a content image of an ear and an ear parameter. The ear parameter learning unit 135 corresponds to a first learning unit according to the present disclosure. An image including a content image of an ear may be an image obtained by actually capturing an ear of a person or may be a CG image generated based on an ear parameter as described later.

For example, the ear parameter learning unit 135 generates an ear parameter estimation model by learning the relation between an ear parameter and an ear image obtained by rendering three-dimensional data obtained by synthesizing three-dimensional data of an ear generated based on the ear parameter with three-dimensional data of a head. Specifically, the ear parameter learning unit 135 learns the relation between a CG image generated by the image generation unit 134 and an ear parameter. As described above, the image generation unit 134 generates the CG image based on a randomly or regularly set ear parameter, and thus the ear parameter is uniquely determined for the CG image. Accordingly, by learning the relation between an input CG image and an ear parameter, the ear parameter learning unit 135 can generate, when an image is input, a model that outputs an ear parameter corresponding to a content image of an ear included in the image. Note that the ear parameter learning unit 135 does not necessarily use, for learning, an ear image obtained by rendering three-dimensional data synthesized with a head. Specifically, the ear parameter learning unit 135 may generate an ear parameter estimation model by learning the relation between an ear parameter and an ear image obtained by rendering only three-dimensional data of an ear generated based on the ear parameter.

In addition, the ear parameter learning unit 135 generates an ear parameter estimation model by learning the relation between a plurality of ear images among which the texture of three-dimensional data of an ear or a head, the camera angle thereof in rendering, the luminance thereof in rendering, or the like is different and an ear parameter common to the plurality of ear images. In this manner, the ear parameter learning unit 135 performs learning by using ear images of various aspects, and thus can generate a reliable and robust model that can accurately output an ear parameter when any image is input (for example, can perform reliable estimation for any change of information other than an ear parameter included in an input image).

Figure 6:
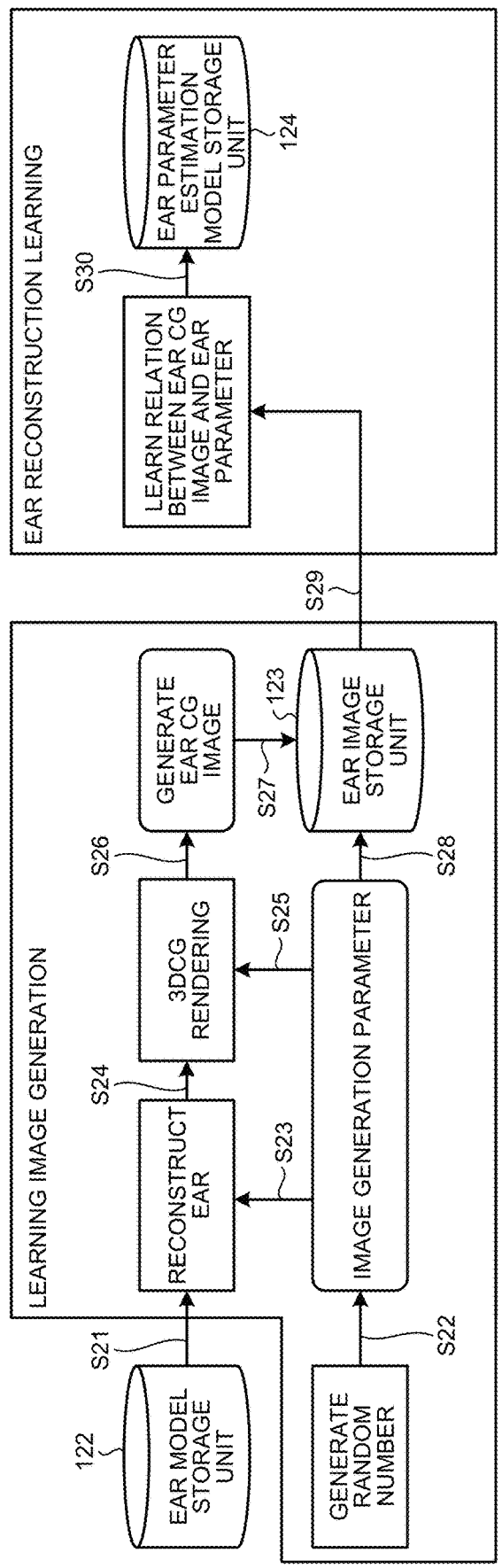
FIG. 6 is a diagram illustrating exemplary learning processing related to an ear parameter estimation model according to the present disclosure.

Exemplary learning processing executed by the image generation unit 134 and the ear parameter learning unit 135 will be described below with reference to FIG. 6. FIG. 6 is a diagram illustrating exemplary learning processing related to an ear parameter estimation model according to the present disclosure.

As illustrated in FIG. 6, the image generation unit 134 refers to the ear model storage unit 122 (step S21) and acquires an ear model. Then, the image generation unit 134 generates a random number corresponding to an ear parameter and random numbers corresponding to CG texture, a rendering camera angle, and the like (step S22). In other words, the image generation unit 134 generates various parameters (image generation parameters) for generating an ear image.

Then, the image generation unit 134 acquires an ear parameter among the image generation parameters (step S23) and reconstructs a 3D model of an ear by inputting the acquired ear parameter to the ear model (step S24).

Subsequently, the image generation unit 134 acquires a parameter such as the CG texture among the image generation parameters (step S25) and provides the 3D model with 3DCG rendering by inputting the acquired parameter (step S26). Note that a head used in the rendering is, for example, an average head of a plurality of persons (for example, a plurality of persons for which ear forms are collected), the 3D model of a head used as a sample, or the like. Similarly to an ear model, the 3D model of a head may be generated by homogenizing 3D data obtained by performing 3D scanning of the heads of a plurality of persons. In this case, the image generation unit 134 can randomly generate the head 3D model by performing parameter generation with a random number. Note that the image generation unit 134 may generate, for texture, a texture model generated by the same method, thereby generating various kinds of texture with random numbers.

Accordingly, the image generation unit 134 generates an image (ear image) including a content image of an ear. Note that the image generation unit 134 can generate a plurality of ear images from one 3D model by changing a parameter such as texture in various manners.

Figure 7:
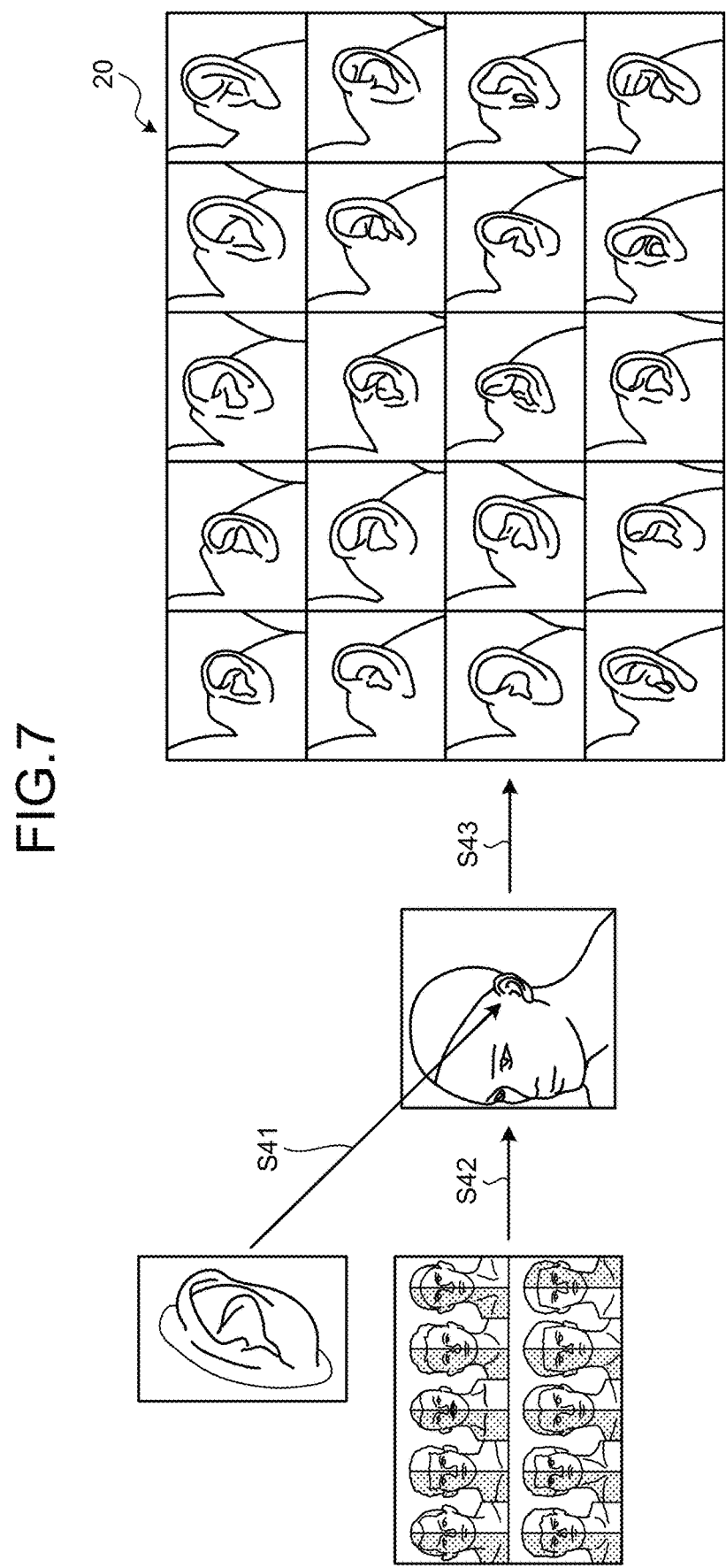
FIG. 7 is a diagram illustrating exemplary ear image generation processing according to the present disclosure.

An exemplary ear image generated by the image generation unit 134 will be described below with reference to FIG. 7. FIG. 7 is a diagram illustrating exemplary ear image generation processing according to the present disclosure.

The image generation unit 134 generates a 3D model indicating the three-dimensional shape of an ear by using a randomly generated ear parameter (step S41). Then, the image generation unit 134 acquires a head 3D model generated based on data indicating the three-dimensional shape of an average head of a plurality of persons (step S42). Then, the image generation unit 134 generates the 3D model of a pseudo person by synthesizing the ear 3D model generated at step S41 and the head 3D model acquired at step S42.

Subsequently, the image generation unit 134 performs processing (rendering) of generating a two-dimensional image from the generated 3D model by performing pseudo image capturing of the 3D model. For example, the image generation unit 134 sets, as a pseudo image capturing angle, the angle of the front surface of the ear in the 3D model and generates an image in which a content image of the ear is substantially at the center.

The image generation unit 134 changes the CG texture (specifically, skin color or the like), the rendering quality (resolution or the like), the position of the ear relative to the head, and the like in various manners by randomly inputting image generation parameters into the 3D model. Accordingly, the image generation unit 134 can generate a large number of images among which the skin color and the like are different (step S43).

An image group 20 represents a plurality of ear images generated by the image generation unit 134. In this manner, the image generation unit 134 generates a larger number of various kinds of ear images, thereby improving ear image recognition accuracy to be described later.

Description continues with reference to FIG. 6 again. The image generation unit 134 stores the generated ear images in the ear image storage unit 123 (step S27). Note that the image generation unit 134 stores, in the ear image storage unit 123 in association with each generated ear image, the image generation parameter when the image is generated (step S28). Accordingly, the image generation unit 134 can hold, as learning data, a larger number of ear images each associated with an ear parameter. For example, the image generation unit 134 can hold, as learning data, a large number of ear images each associated with an ear parameter.

Subsequently, the ear parameter learning unit 135 refers to the ear image storage unit 123 (step S29) and acquires each ear image and the corresponding ear parameter. Then, the ear parameter learning unit 135 generates an ear parameter estimation model by learning the relation between the ear image and the ear parameter. The ear parameter learning unit 135 stores the generated ear parameter estimation model in the ear parameter estimation model storage unit 124 (step S30).

The ear parameter estimation model is generated by using, for example, a convolutional neural network that is useful for extracting the characteristic amount of an image. Note that a cost expression (cost function) in learning is given by, for example, Expression (1) below.

$$L(\alpha_{true}, \alpha_{est}) = \|A_{ear}\alpha_{true} - A_{ear}\alpha_{est}\|_2^2 \qquad (1)$$

In Expression (1), "$\alpha_{true}$" represents the true value of an ear parameter, "$\alpha_{est}$" represents an estimated value of the ear parameter, and "$A_{car}$" represents an ear model obtained by principal component analysis. The distance function on the right hand side represents the L2 norm (Euclidean distance). Note that the true value of an ear model parameter may be, for example, a parameter representing an ear of a person, which is measured at ear form collection. Specifically, the true value is an ear parameter used to generate an ear image, and the estimated value is a value output when the ear image is input to an ear parameter estimation model in learning. As learning processing, the information processing device 100 updates a coefficient that minimizes the value of the cost expression for a current estimated value.

Figure 8:
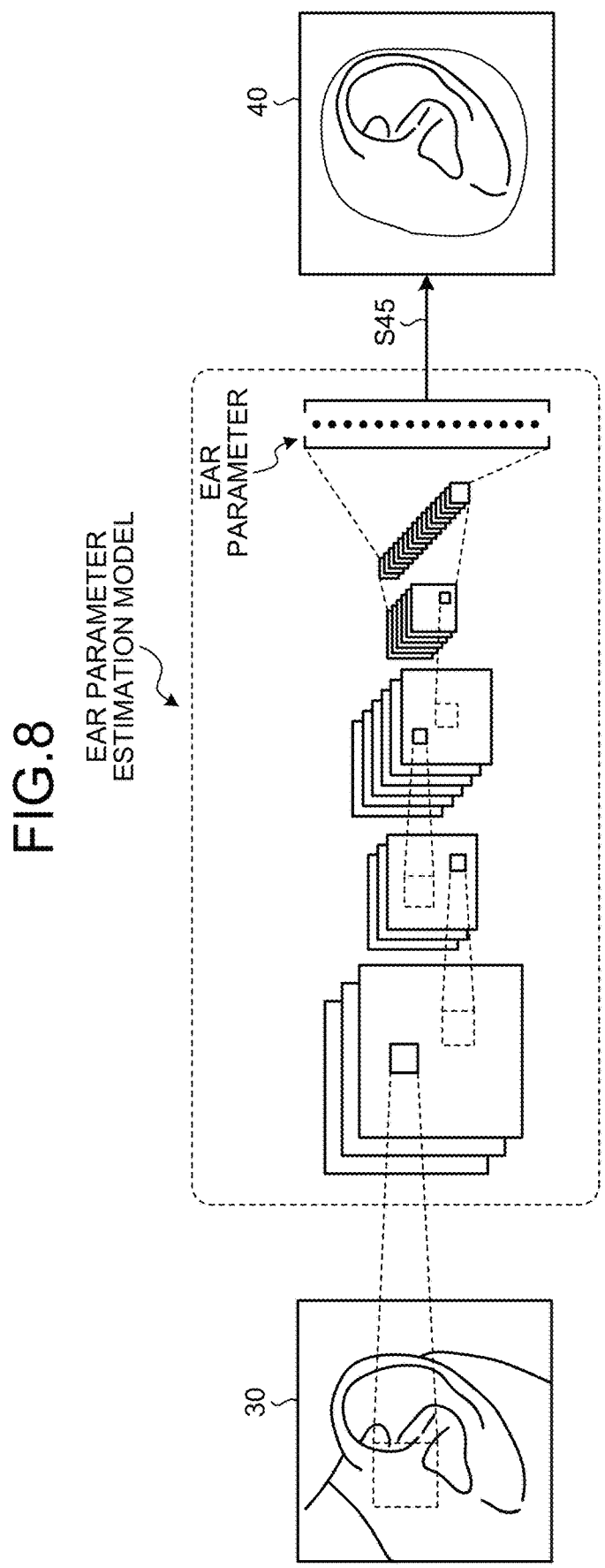
FIG. 8 is a diagram for describing the ear parameter estimation model according to the present disclosure.

The ear parameter estimation model generated by the ear parameter learning unit 135 will be described below with reference to FIG. 8. FIG. 8 is a diagram for describing the ear parameter estimation model according to the present disclosure.

When having acquired an ear image 30, the information processing device 100 inputs the acquired ear image 30 to the ear parameter estimation model. The ear parameter estimation model has, for example, the structure of a convolutional neural network, divides the input ear image 30 into rectangular parts each having several pixels, and calculates a characteristic amount representing the ear image 30. Finally, the ear parameter estimation model outputs, as the characteristic amount representing the ear image 30, an ear parameter corresponding to the content image of the ear included in the ear image 30 (step S45).

Note that the information processing device 100 can reconstruct an ear form (3D model) corresponding to the ear included in the ear image 30 by inputting the output ear parameter to an ear model. A 3D model 40 illustrated in FIG. 8 is a 3D model through which the ear included in the ear image 30 is reconstructed by CG based on an ear parameter.

Description continues with reference to FIG. 3 again. The HRTF learning unit 136 learns the relation between information related to the shape of an ear and an HRTF, thereby generating various models related to the HRTF. For example, the HRTF learning unit 136 learns the relation between an image including a content image of an ear and an HRTF corresponding to the ear, thereby generating a learned model that calculates the HRTF. The HRTF learning unit 136 corresponds to a second learning unit according to the present disclosure.

For example, the HRTF learning unit 136 performs acoustic simulation for three-dimensional data obtained by synthesizing three-dimensional data of an ear generated based on an ear parameter and three-dimensional data of a head and learns the relation between an HRTF obtained through the acoustic simulation and the ear parameter, thereby generating a learned model.

Alternatively, the HRTF learning unit 136 may compress the amount of information of the HRTF obtained through the acoustic simulation and learn the relation between the compressed HRTF and the ear parameter, thereby generating a learned model.

Alternatively, the HRTF learning unit 136 may set a hearing point of three-dimensional data of an ear generated based on the ear parameter and perform the acoustic simulation by using the set hearing point. The hearing point is a virtually set position where it is assumed that a person hears sound. For example, the position of the hearing point corresponds to a position (such as the entrance of an external ear canal of a dummy head) at which a microphone is installed in a dummy head microphone.

Figure 9:
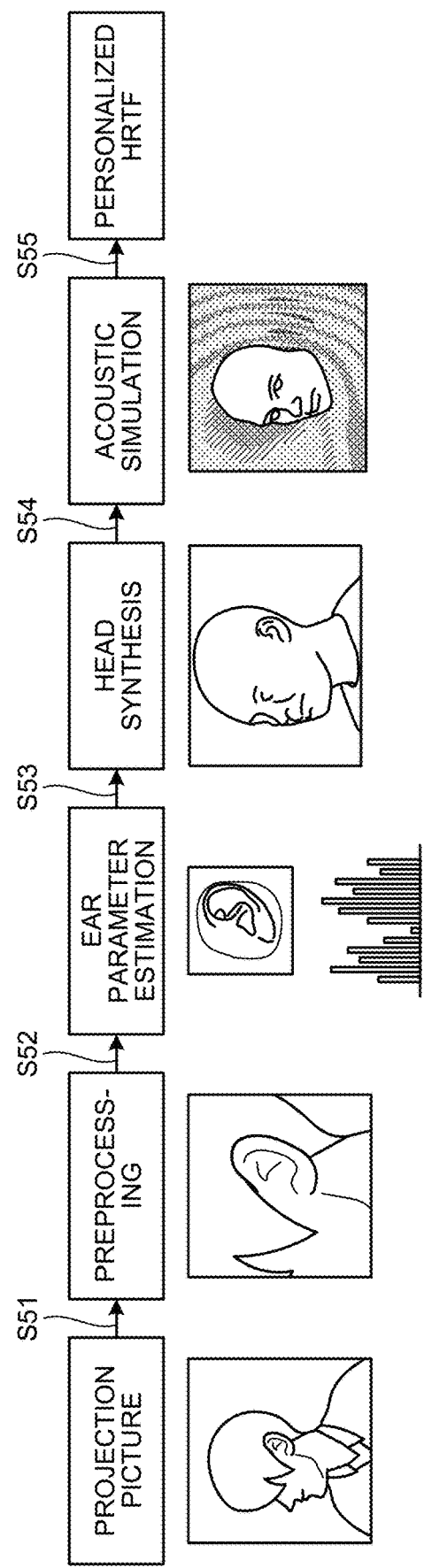
FIG. 9 is a diagram illustrating an outline of the process of processing of generating a model related to an HRTF.

As for each above-described processing of the HRTF learning unit 136, FIG. 9 illustrates the process of processing of generating various models related to an HRTF. FIG. 9 is a diagram illustrating an outline of the process of processing of generating various models related to an HRTF.

FIG. 9 illustrates an example in which the HRTF learning unit 136 performs predetermined learning processing based on an image transmitted from a user. In this case, the user performs image capturing of an ear (head including the ear, to be precise) of the user by using the user terminal 10 (step S51). Thereafter, the user terminal 10 performs preprocessing of specifying a range including a content image of the ear in a captured picture and cutting out the specified range to acquire an ear image (step S52).

Thereafter, the HRTF learning unit 136 calculates, by using an ear parameter estimation model, the ear parameter of the ear included in the ear image transmitted from the user (step S53). In addition, the HRTF learning unit 136 reconstructs the 3D model of the ear based on the ear parameter and combines a head 3D model to the reconstructed ear, thereby generating the 3D model of the person (step S54).

Subsequently, the HRTF learning unit 136 performs acoustic simulation for the generated 3D model to calculate the personalized HRTF of the 3D model (step S55). Accordingly, the HRTF learning unit 136 can obtain learning data in which the ear included in the ear image transmitted from the user is associated with the personalized HRTF.

Note that, in the example illustrated in FIG. 9, learning data in which a personalized HRTF obtained through acoustic simulation is associated with data of an ear is generated, but the HRTF learning unit 136 does not necessarily need to obtain a personalized HRTF through acoustic simulation in some cases. For example, when the personalized HRTF (HRTF obtained by using a measurement device in an anechoic room or the like) of a person for which an ear form is collected is obtained, the HRTF learning unit 136 may acquire learning data in which the measured personalized HRTF is associated with the ear form (ear parameter) of the person.

Figure 10:
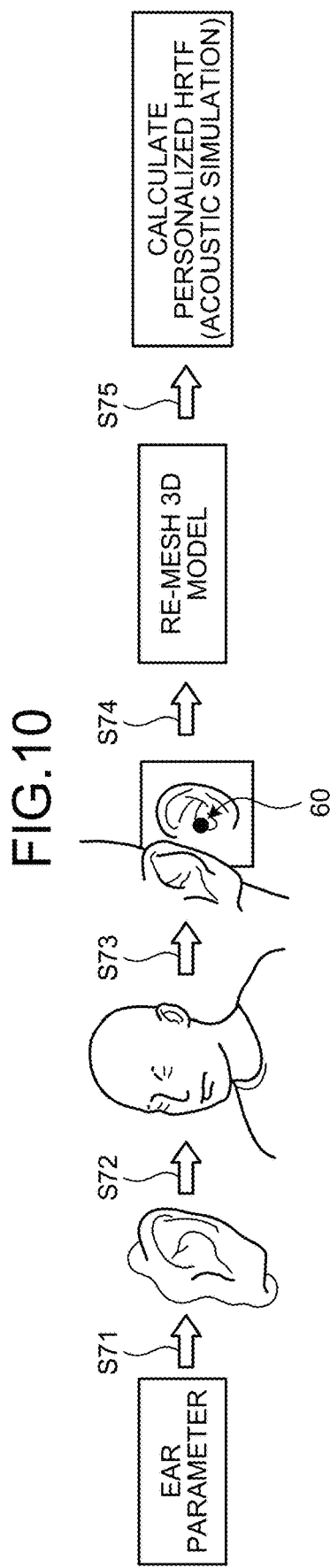
FIG. 10 is a diagram for describing 3D model reconstruction according to the present disclosure.

At acoustic simulation, the HRTF learning unit 136 automatically sets a hearing point in the 3D model of a person. This will be described below with reference to FIG. 10. FIG. 10 is a diagram for describing 3D model reconstruction according to the present disclosure.

The HRTF learning unit 136 reconstructs an ear 3D model based on a randomly generated ear parameter (step S71). Subsequently, the HRTF learning unit 136 generates the 3D model of a person by combining the ear 3D model with a head 3D model (step S72). In addition, the HRTF learning unit 136 sets a hearing point 60 of a sound source based on the shape of an ear in the 3D model, (step S73). For example, the HRTF learning unit 136 may automatically set a hearing point by learning, in advance, information in which the shape of an ear and the position of a hearing point of a sound source are associated with each other. For example, at a timing when the 3D model is generated, the HRTF learning unit 136 estimates the position of a hearing point in the 3D model, thereby automatically setting the hearing point. A hearing point corresponds to, for example, the external ear canal of an ear, and typically, the position thereof can be estimated based on the shape of the ear.

Thereafter, the HRTF learning unit 136 re-meshes the generated 3D model to satisfy a constraint on 3D model calculation in acoustic simulation (step S74). This is because, in 3D model simulation, the upper limit of the total number of polygons, the length of an edge connecting apexes, and the like are determined due to simulation conditions. In other words, before simulation with the generated 3D model, the HRTF learning unit 136 processes the 3D model by re-meshing as appropriate to satisfy a calculation constraint so that the simulation can be appropriately performed. Then, the HRTF learning unit 136 performs acoustic simulation for the generated 3D model and the set hearing point 60, thereby calculating a personalized HRTF (step S75).

Figure 11:
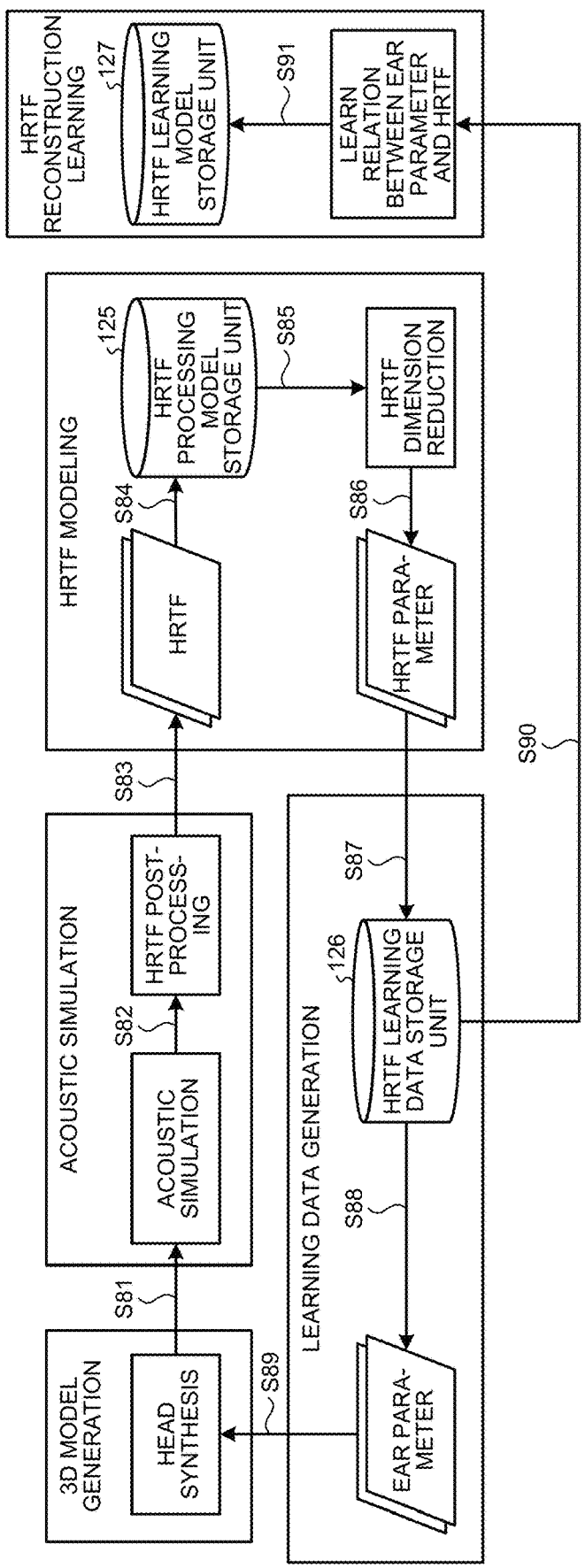
FIG. 11 is a diagram for describing details of the processing of generating the model related to the HRTF.

Subsequently, a detailed process of processing of generating models related to an HRTF will be described below with reference to FIG. 11. FIG. 11 is a diagram for describing details of the processing of generating models related to an HRTF.

As illustrated in FIG. 10, the HRTF learning unit 136 performs head synthesis (step S81) and then performs acoustic simulation (step S82). The HRTF learning unit 136 analyzes measurement data obtained through the acoustic simulation (HRTF postprocessing) and calculates a numerical value representing a personalized HRTF (step S83). Note that the HRTF postprocessing is, for example, calculation of an HRTF through Fourier transform of a head-related impulse response (HRIF) obtained through the acoustic simulation.

Then, the HRTF learning unit 136 refers to the HRTF processing model storage unit 125 (step S84) and inputs the calculated HRTF to a model (HRTF processing model) for processing the HRTF. Accordingly, the HRTF learning unit 136 obtains an HRTF having a reduced dimension (step S85). Specifically, the HRTF learning unit 136 outputs, from the HRTF processing model, an HRTF parameter as the HRTF having a reduced dimension (step S86).

In this manner, the HRTF learning unit 136 performs processing by using the HRTF parameter having a reduced dimension instead of directly using, in the processing, the HRTF obtained through the acoustic simulation. This is because the HRTF is a function having an extremely large number of dimensions and thus leads to a large computation processing load when directly used in model generation processing and calculation processing.

The HRTF learning unit 136 stores data (data on which the head synthesis is based, such as an ear parameter) related to a head for which the acoustic simulation is performed, and the calculated HRTF parameter in the HRTF learning data storage unit 126 in association with each other (step S87).

Thereafter, the HRTF learning unit 136 newly generates a different random ear parameter (step S88) and performs head synthesis by using the newly generated ear parameter (step S89). The HRTF learning unit 136 repeats steps S81 to S89 to collect learning data necessary for learning.

Thereafter, when a sufficient amount of learning data is accumulated, the HRTF learning unit 136 refers to the HRTF learning data storage unit 126 (step S90) and learns the relation between an ear parameter and an HRTF (HRTF parameter, to be precise) (step S91). Through the learning, the HRTF learning unit 136 generates an HRTF learning model for obtaining an HRTF directly from an ear parameter, and stores the generated HRTF learning model in the HRTF learning model storage unit 127.

Figure 12:
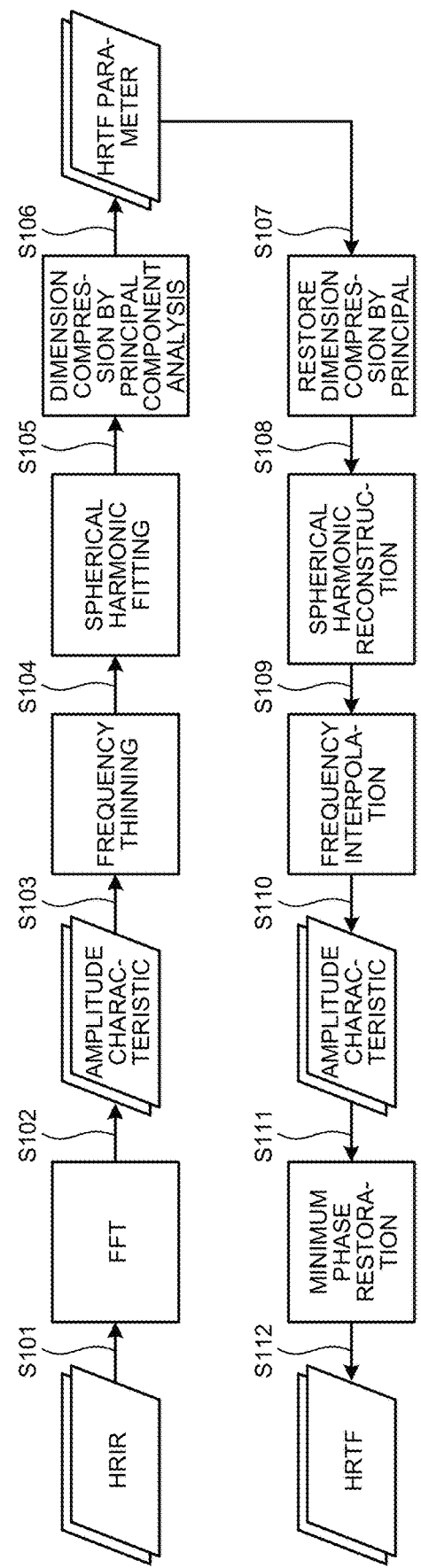
FIG. 12 is a diagram for describing compression and decompression of the HRTF according to the present disclosure.

Subsequently, the relation between an HRTF and an HRTF parameter will be described below with reference to FIG. 12. FIG. 12 is a diagram for describing HRTF compression and decompression according to the present disclosure.

As illustrated in FIG. 12, the HRTF learning unit 136 performs fast Fourier transform (FFT) of an HRIFHRTF ((for example, 1000 directions×500 taps in the example of FIG. 12) obtained through acoustic simulation (step S101). Through this processing, the HRTF learning unit 136 extracts an amplitude characteristic (step S102) and performs, for example, thinning processing of a frequency component for which hearing sensitivity is low or the like (step S103). Specifically, the HRTF can be expressed as a function HRTF ($\theta$, $\varphi$, f) of angles (denoted by $\theta$ and $\varphi$) and a frequency (denoted by f). In this case, when k represents the number of bins of the frequency, the frequency f input to the function is expressed as $f_k = f_0, f_1, f_2, \ldots, f_{k-1}$. In other words, the HRTF has complex k dimensions for one direction and one ear. The HRTF at the Nyquist frequency ($f_{k/2}$) or higher is obtained by folding the complex conjugate at the frequency $f_{k/2}$ or lower, and thus in the information processing, only (k/2)+1 frequencies from f0=0 to the Nyquist frequency ($f_{k/2}$) can be used as a frequency bin. Absolute values can be used for at least one frequency bin. For example, when all frequencies of $f_0$ to $f_{k/2}$ are converted into absolute values, a function $H_2$ after the conversion is given by Expression (2) below.

$$H_2(\theta,\varphi,k) = |HRTF(\theta,\varphi,f_k)|(f_k = f_0, f_1, \ldots, f_{k/2}) \qquad (2)$$

Specifically, the HRTF learning unit 136 can compress the dimension of the original HRTF to the dimension of a real number (k/2)+1. The HRTF learning unit 136 can achieve further reduction to a dimension smaller than (k/2)+1 by performing frequency compression for $H_2$ in the above-described expression (2). Various kinds of known methods exist for the dimension compression. For example, the HRTF learning unit 136 uses a method of performing cepstral conversion on the function to acquire only frequency bins in a number equal to or larger than one and smaller than (k/2)+1. In an example, the HRTF learning unit 136 calculates an average value of a plurality of frequency bins and performs dimension reduction based on the average value. For example, when a frequency bin is given by Expression (3) below ($a_l$, L, and l are integers equal to or larger than zero), a new function $H_3$ is given by Expression (4) below by using l that satisfies $f_{a_l} \leq f'_l < f_{a_{l+1}}$.

$$0 \leq a_0 < a_1 < a_2 ... < a_{L-1} \leq K/2, L < K/2 + 1 \qquad (3)$$

$$H_3(\theta, \phi, l) = \frac{1}{a_{l+1} - a_l} \sum_{k=a_l}^{a_{l+1}-1} H_2(k) \qquad (4)$$

Accordingly, the HRTF learning unit 136 can reduce the function $H_2$ expressed in (K/2)+1 dimensions to L dimensions. Note that the method of calculating the average value is not limited to that described above, but the average value may be calculated by using, for example, root-mean-square or weighted average. Accordingly, the HRTF is reduced to, for example, 1000 directions×50 dimensions. Note that when the dimension reduced by the function $H_3$ is restored (for example, step S110 to be described later), the HRTF learning unit 136 can restore the dimension by using various kinds of methods such as linear interpolation or spline interpolation. It is expected that a function $H'_2$ having the restored dimension has a characteristic smoother than that of the function $H_2$, and $H'_2(\theta, \phi, k)$ that provides smaller hearing influence can be obtained by contriving the way of selecting $a_l$. For example, $a_l$ may be selected so that the frequency interval between $f_{al}$ and $f_{al+1}$ is larger at a higher frequency.

The HRTF learning unit 136 further performs processing of spherical harmonic fitting on the HRTF having a reduced dimension, thereby compressing the amount of information to 50 coefficient×50 dimensions (step S104). The spherical harmonic fitting is spatial directional fitting for each compressed frequency by using spherical harmonics. The relation between the HRTF and the spherical harmonics is given by Expression (5) below.

$$H(\theta, \phi, f) = \sum_{n=0}^{\infty} \sum_{m=-n}^{n} h_{nm}(f) Y_n^m(\theta, \phi) \qquad (5)$$

As in the above-described expression (5), a spherical harmonics Y is expressed by a coefficient $h_{nm}(f)$. A dimension number n in this case can be truncated at a finite value N to set the dimension of the coefficient $h_{nm}(f)$ to be smaller than the dimension number (direction number) of the original HRTF. This means discarding of spatially too fine amplitudes that are unnecessary for perception of a person and acquisition of only a smooth shape. Note that, for example, a least-square method is used to calculate a vector $h = (h_{00}, h_{1-1}, \dots)^T$ of the coefficient $h_{nm}$.

$$E = \|H - Yh\|^2 + \lambda \|h\|^2 \qquad (6)$$

Specifically, in the above-described expression (6), h that minimizes E on the left-hand side is calculated when Y represents a spherical harmonic matrix and H represents a spherical harmonic matrix. Note that the second term on the right hand side of the above-described expression (6) is a regularization term, and thus an arbitrary value may be selected as $\lambda$ (for example, $\lambda$ may be zero). Accordingly, the above-described h is given by Expression (7) below.

$$h = (Y^T Y + \lambda I)^{-1} Y^T H \qquad (7)$$

By using the above-described expression (7), the HRTF learning unit 136 can obtain each h corresponding to a necessary frequency. In addition, the HRTF learning unit 136 performs dimension compression by principal component analysis so that the amount of information of the HRTF can be expressed in several hundred dimensions approximately (step S105). This information is an HRTF parameter (step S106).

Note that when the spherical harmonic fitting is performed after the frequency thinning, the value of the above-described f is a representative frequency after the thinning. The HRTF learning unit 136 may perform the frequency thinning after the spherical harmonic fitting. The method of spatially compressing dimension is not limited to linear combination such as the spherical harmonics and principal component analysis but may be any method. For example, the HRTF learning unit 136 may use a non-linear method such as kernel principal component analysis. The HRTF learning unit 136 may change the truncating order N of the spherical harmonics in accordance with the frequency f and use the value of N(f). There may be a coefficient $h_{nm}$ that is not used in the dimension number of 0 to N nor the order. The HRTF learning unit 136 may calculate right and left HRTFs or may calculate the right and left HRTFs after conversion into the sum or difference of the right and left HRTFs. A fitting target HRTF may be provided with various kinds of conversion into, for example, the absolute value of amplitude and the logarithm representation thereof.

Subsequently, the HRTF learning unit 136 can decode the HRTF by performing processing in a process opposite to that of steps S101 to S106. First, the HRTF learning unit 136 acquires the HRTF parameter (step S107) and restores dimension compression by principal component analysis (step S108). In addition, the HRTF learning unit 136 performs spherical harmonic reconstruction processing (step S109) and performs frequency interpolation (step S110). In addition, the HRTF learning unit 136 obtains an amplitude characteristic (step S111) and performs minimum phase restoration (step S112). The minimum phase restoration may employ various kinds of known methods. For example, the HRTF learning unit 136 performs inverse fast Fourier transform (IFFT) of the logarithm of a function $H'1(\theta, \phi, k)$ restored by folding the above-described function $H'2$ at the Nyquist frequency or higher, and determines the real part of a result of the conversion. In addition, appropriate wind processing is performed in this region, inverse fast Fourier transform of the exponential function thereof is performed, and the real part is determined, thereby performing the minimum phase restoration. For example, each relational Expression (8) as described below holds.

$$H'_1(\theta, \phi, k) = \begin{cases} H'_2(\theta, \phi, k) & (\text{for } 0 \leq k \leq K/2) \\ H'_2(\theta, \phi, K-k) & (\text{for } K/2 < k \leq K-1) \end{cases} \qquad (8)$$

$$H_c(\theta, \phi) = \text{Re}\{F^{-1}[H'_1(\theta, \phi)]\}$$

$$H_w(\theta, \phi, k) = \begin{cases} H_c(\theta, \phi, k) & (\text{for } K = 0, K/2) \\ 2H_c(\theta, \phi, k) & (\text{for } 1 \leq k \leq K/2 - 1) \\ 0 & (\text{for } K/2 \leq k \leq K-1) \end{cases}$$

$$H_m(\theta, \phi) = \text{Re}\{F^{-1}[\exp(H_w(\theta, \phi))]\}$$

Note that the HRTF learning unit 136 may add an estimated interaural time difference (ITD) or an ITD prepared in advance to the right HRIR (h$_m$) and the left HRIR (h$_m$) subjected to the minimum phase restoration. Note that an ITD is calculated by, for example, Expressions (9) and (10) below based on the group delay difference between the right HRIR and the left HRIR.

$$ITD_g(\theta, \phi, f) = \frac{1}{2\pi}\left(\frac{d\varphi_L}{df} - \frac{d\varphi_R}{df}\right) \quad (9)$$

$$\varphi_L = \arctan\left(\frac{\mathrm{Im}(HRTF_L(f))}{\mathrm{Re}(HRTF_L(f))}\right) \quad (10)$$

Alternatively, the ITD may be calculated by determining a time-axial mutual correlation between the right and left and defining the ITD to be a time at which a correlation coefficient is maximum. In this case, the ITD is calculated by, for example, Expressions (11) and (12) below.

$$(\tau) = a\frac{\int_{-\infty}^{+\infty} h_L(t+\tau)h_R(t)dt}{\sqrt{\int_{-\infty}^{+\infty} h_L^2(t)dt \cdot \int_{-\infty}^{+\infty} h_R^2(t)dt}} \quad (11)$$

$$ITD_{corr}(\theta,\phi) = \tau_{max} \quad (12)$$

For example, the HRTF learning unit 136 uses a relational expression such as Expression (13) below to retard the left HRIR relative to the right HRIR by d samples.

$$h_L(i) = \begin{cases} 0 & \text{for } i < d \\ h_{m,L}(i-d) & \text{for } i \geq d \end{cases} \quad (13)$$

In this case, h$_L$ in the above-described expression (13) is an impulse response longer than h$_{m,L}$ by d, and a length equal to that of h$_{m,L}$ is achieved by deleting the second half of the above-described expression (13). In this case, the HRTF learning unit 136 may perform, for example, optional window, rectangular window, or Hanning window processing. Note that the HRTF learning unit 136 may not only add the ITD for each direction but also add a delay including a relative time difference between directions in the entire space. In this case, the HRTF learning unit 136 acquires not only the ITD but also information indicating the relative time difference between directions. When the ITD is a function of frequency, the HRTF learning unit 136 may add the ITD in the frequency domain or may calculate a representative value or an average value and then add the ITD. The HRTF learning unit 136 acquires each HRIR in the original format and then performs inverse fast Fourier transform to obtain the HRTF.

In this manner, the HRTF learning unit 136 may perform compression to the HRTF parameter having an information amount smaller than that of the original HRTF and perform, in the compressed format, HRTF learning model generation processing and HRTF calculation processing to be described later. In addition, as described above, the HRTF compression performs dimension reduction utilizing a hearing sense characteristic by, for example, using less sensitivity of human hearing to phase change or performing preferential thinning of a frequency that is unlikely to affect hearing. Accordingly, the HRTF learning unit 136 can increase information processing speed without losing hearing stationary as an HRTF characteristic.

Description continues with reference to FIG. 3 again. The estimation unit 140 performs processing of estimating an HRTF corresponding to a user based on an image transmitted from the user.

The acquisition unit 141 acquires an image including a content image of an ear of the user. For example, the acquisition unit 141 acquires a cutout ear image around an ear of the user from an image captured by the user terminal 10.

The acquisition unit 141 may input the acquired ear image to an ear parameter estimation model to acquire an ear parameter indicating a characteristic of the ear included in the image.

The calculation unit 142 calculates, based on the image acquired by the acquisition unit 141, an HRTF (personalized HRTF) corresponding to the user by using a learned model (HRTF learning model) having learned to output an HRTF corresponding to an ear when an image including a content image of the ear is input.

Specifically, the calculation unit 142 calculates the personalized HRTF corresponding to the user by inputting the ear parameter acquired by the acquisition unit 141 into the HRTF learning model.

Note that when calculating the personalized HRTF, the calculation unit 142 may first calculate an HRTF parameter and then calculate the HRTF by decoding the calculated HRTF parameter. In this manner, the calculation unit 142 can increase processing speed by performing a series of pieces of processing while the amount of information of the HRTF is compressed. In addition, the calculation unit 142 can avoid outputting of an odd HRTF that is not expressed in an HRTF reduction model, and thus can perform reliable outputting.

The provision unit 143 provides the HRTF calculated by the calculation unit 142 to the user through the network N.

Figure 13:
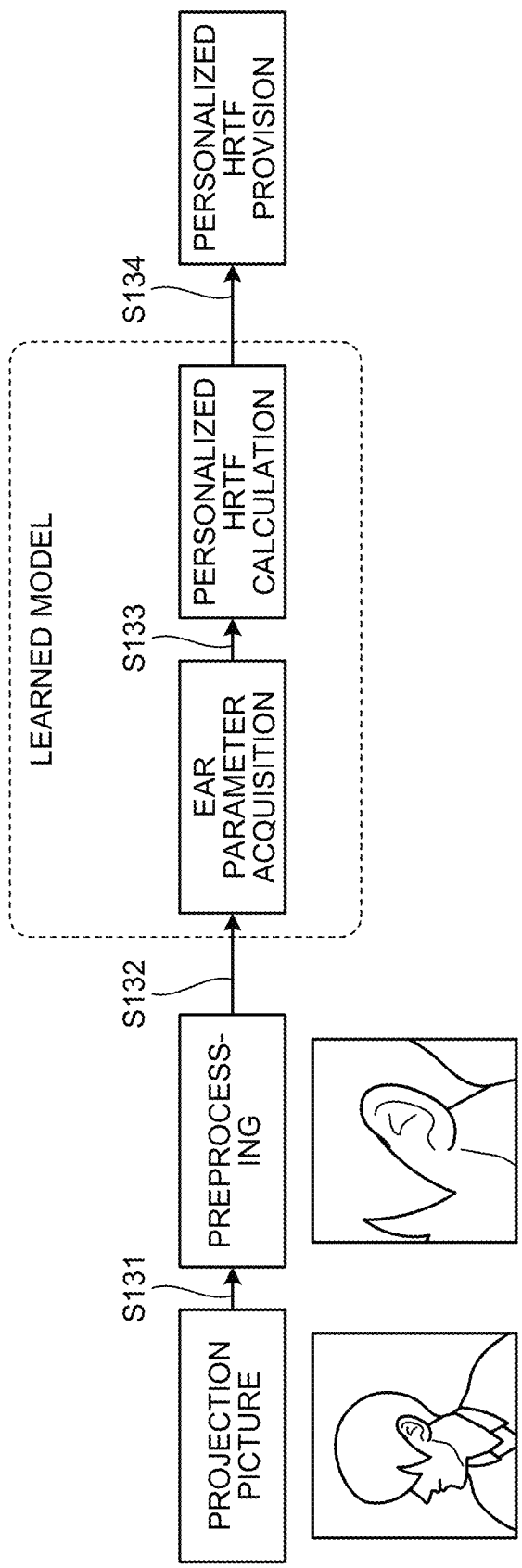
FIG. 13 is a diagram illustrating the process of HRTF estimation processing according to the present disclosure.

The process of processing of estimating an HRTF from an image will be described below with reference to FIG. 13. FIG. 13 is a diagram illustrating the process of HRTF estimation processing according to the present disclosure.

FIG. 13 illustrates an example in which the estimation unit 140 performs, based on an image transmitted from a user, the processing of estimating an HRTF corresponding to an ear included in the image. In this case, the user performs image capturing of an ear (head including the ear, to be precise) of the user by using the user terminal 10 (step S131). Thereafter, the user terminal 10 performs preprocessing of specifying a range including a content image of the ear in a captured picture and cutting out the specified range to acquire an ear image (step S132).

When having acquired the ear image transmitted from the user, the acquisition unit 141 inputs the acquired ear image to a learned model. Specifically, the acquisition unit 141 inputs the ear image to an ear parameter estimation model. The ear parameter estimation model outputs, as a characteristic amount indicating the ear image, an ear parameter corresponding to the content image of the ear included in the ear image. Accordingly, the acquisition unit 141 acquires the ear parameter corresponding to the image (step S133).

The calculation unit 142 inputs the acquired ear parameter into an HRTF learning model and calculates a personalized HRTF corresponding to the ear image (step S133). The provision unit 143 provides (transmits) the calculated personalized HRTF to the user terminal 10 from which the image is transmitted (step S134).

In this manner, when various kinds of models are generated by the learning unit 131, the information processing device 100 can perform the ear image acquisition to the personalized HRTF provision as a series of pieces of processing. Accordingly, the information processing device 100 can improve convenience related to the HRTF provision for the user.

Note that although a combination of an ear parameter estimation model and an HRTF learning model is illustrated as an exemplary learned model in the example of FIG. 13, a learned model combination is not limited to this example. The learned model may be an individual combination of the ear parameter estimation model and the HRTF learning model or may be configured as one model that performs processing corresponding to the ear parameter estimation model and the HRTF learning model.

[1-4. Configuration of User Terminal According to First Embodiment]

Figure 14:
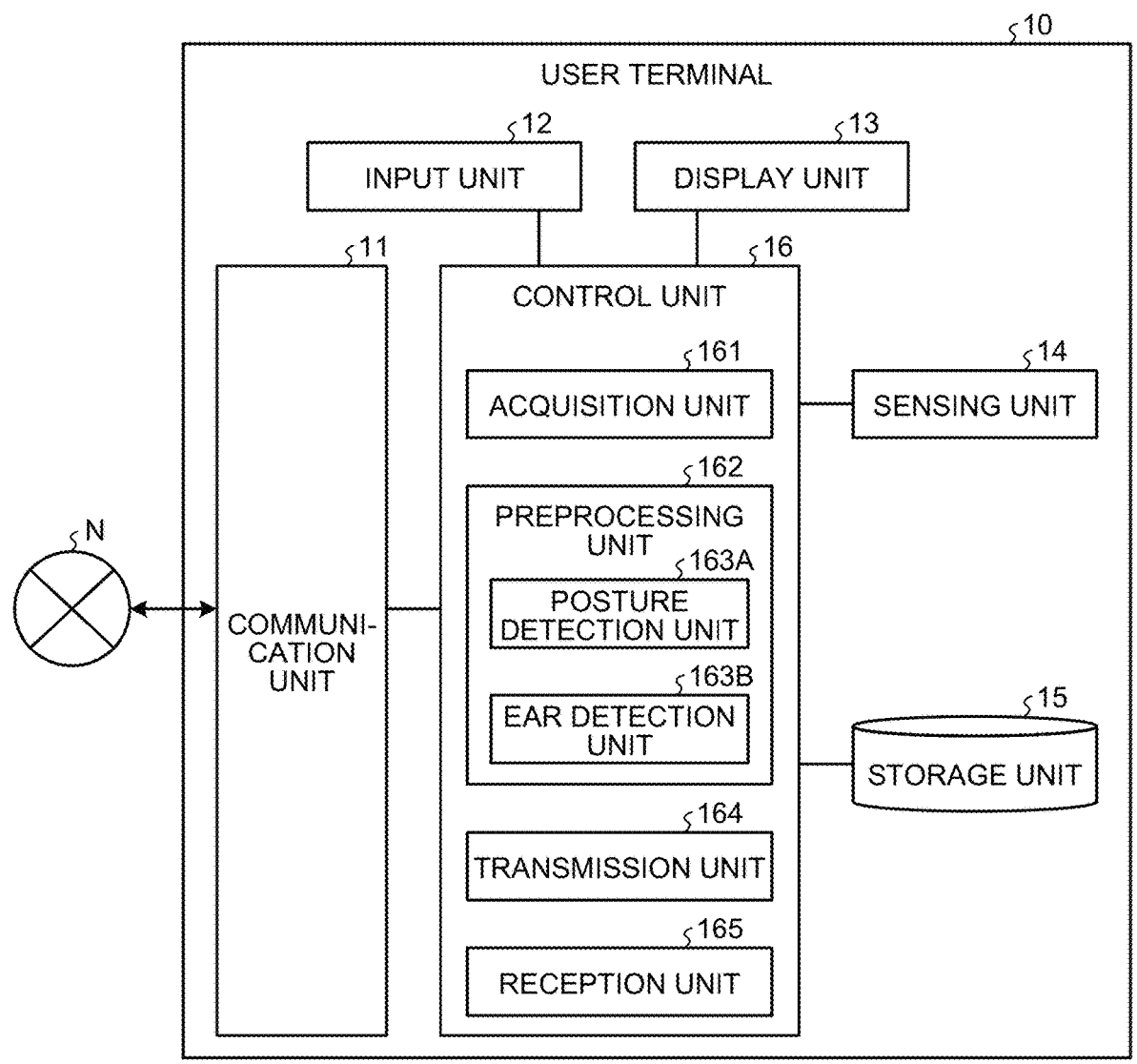
FIG. 14 is a diagram illustrating an exemplary configuration of a user terminal according to the first embodiment of the present disclosure.

As illustrated in FIG. 13, image capturing of a side face of a user and generation of an ear image are performed by the user terminal 10 in the first embodiment. The configuration of the user terminal 10 according to the first embodiment will be described below. FIG. 14 is a diagram illustrating an exemplary configuration of the user terminal 10 according to the first embodiment of the present disclosure. As illustrated in FIG. 14, the user terminal 10 includes a communication unit 11, an input unit 12, a display unit 13, a sensing unit 14, a storage unit 15, and a control unit 16.

The communication unit 11 is achieved by, for example, a NIC. The communication unit 11 is connected with the network N in a wired or wireless manner and transmits and receives information to and from the information processing device 100 and the like through the network N.

The input unit 12 is an input device configured to receive various operations from a user. For example, the input unit 12 is achieved by an operation key or the like included in the user terminal 10. The display unit 13 is a display device for displaying various kinds of information. For example, the display unit 13 is achieved by a liquid crystal display. Note that when the user terminal 10 employs a touch panel, part of the input unit 12 and the display unit 13 are integrated with each other.

The sensing unit 14 collectively refers to various sensors and senses various kinds of information related to the user terminal 10. Specifically, the sensing unit 14 senses an operation on the user terminal 10 by the user, position information of the user terminal 10, information related to an instrument connected with the user terminal 10, environment at the user terminal 10, and the like.

The sensing unit 14 includes, as an exemplary sensor, a lens and an image sensor for performing image capturing. Specifically, for example, the sensing unit 14 functions as a camera when an application configured to operate an image capturing function is activated by the user.

The storage unit 15 stores various kinds of information. The storage unit 15 is achieved by a storage device, for example, a semiconductor memory element such as a RAM or a flash memory, a hard disk, or an optical disk. The storage unit 15 stores, for example, an image captured by the user.

The control unit 16 is a controller achieved by, for example, a CPU or an MPU executing, by using the RAM as a work area, various computer programs stored in a storage device inside the user terminal 10. Alternatively, the control unit 16 is a controller achieved by an integrated circuit such as an ASIC or an FPGA.

As illustrated in FIG. 14, the control unit 16 includes an acquisition unit 161, a preprocessing unit 162, a transmission unit 164, and a reception unit 165 and achieves or executes functions and effects of information processing described below. The preprocessing unit 162 includes a posture detection unit 163A and an ear detection unit 163B. Note that the internal configuration of the control unit 16 is not limited to the configuration illustrated in FIG. 14 but may be any configuration with which the information processing to be described later is performed.

The acquisition unit 161 acquires various kinds of information. For example, the acquisition unit 161 acquires an image captured by the sensing unit 14.

The posture detection unit 163A reads the image acquired by the acquisition unit 161 and detects the posture of the user included in the image.

The ear detection unit 163B detects a range (ear content image) including an ear of the user included in the image based on the posture of the user detected by the posture detection unit 163A. Specifically, the ear detection unit 163B specifies a content image of an ear of the user in an image including a content image of the entire head of the user and detects the specified range as an ear image.

For example, the ear detection unit 163B specifies a range including a content image of an ear based on the relation between each feature point of the head of the user included in the entire image and the posture of the user.

When the range including a content image of an ear cannot be specified based on the relation between each feature point of the head of the user included in the entire image and the posture of the user, the posture detection unit 163A or the ear detection unit 163B may newly request the user to acquire an image that is different from the entire image and including a content image of the entire head of the user. Specifically, the posture detection unit 163A or the ear detection unit 163B prompts the user to perform image capturing again by displaying, on the display unit 13, a message indicating that the information processing according to the present disclosure potentially cannot be appropriately perform with the image of a side face captured by the user. Note that the posture detection unit 163A or the ear detection unit 163B may prompt the user to perform image capturing again not only in a case in which the range including a content image of an ear cannot be specified but also in a case in which, for example, a case in which a camera angle used in learning of an ear parameter estimation model and the posture of the user exceed certain threshold values. In addition, as the preprocessing, the posture detection unit 163A or the ear detection unit 163B may generate correction information that corrects the posture and position of the user in an image instead of detecting the ear image of the user. The correction information is, for example, information that instructs the amount of rotating the range including a content image of the ear or the like in accordance with the tilt and rotation of a feature point of the head of the user. Such information is generated based on the posture of the user, the positional relation between a side face of the user and a detected ear, and the like as described later. In this case, the posture detection unit 163A or the ear detection unit 163B may specify a content image of an ear of the user by correcting rotation of the entire image based on the correction information and may detect the specified range as an ear image. The posture detection unit 163A or the ear detection unit 163B may transmit the entire image together with the generated correction information to the information processing device 100. In this case, the information processing device 100 performs, at the own device, preprocessing of specifying a content image of an ear of the user by correcting rotation of the entire image based on the correction information transmitted together with the entire image and detecting the specified range as an ear image.

Figure 15:
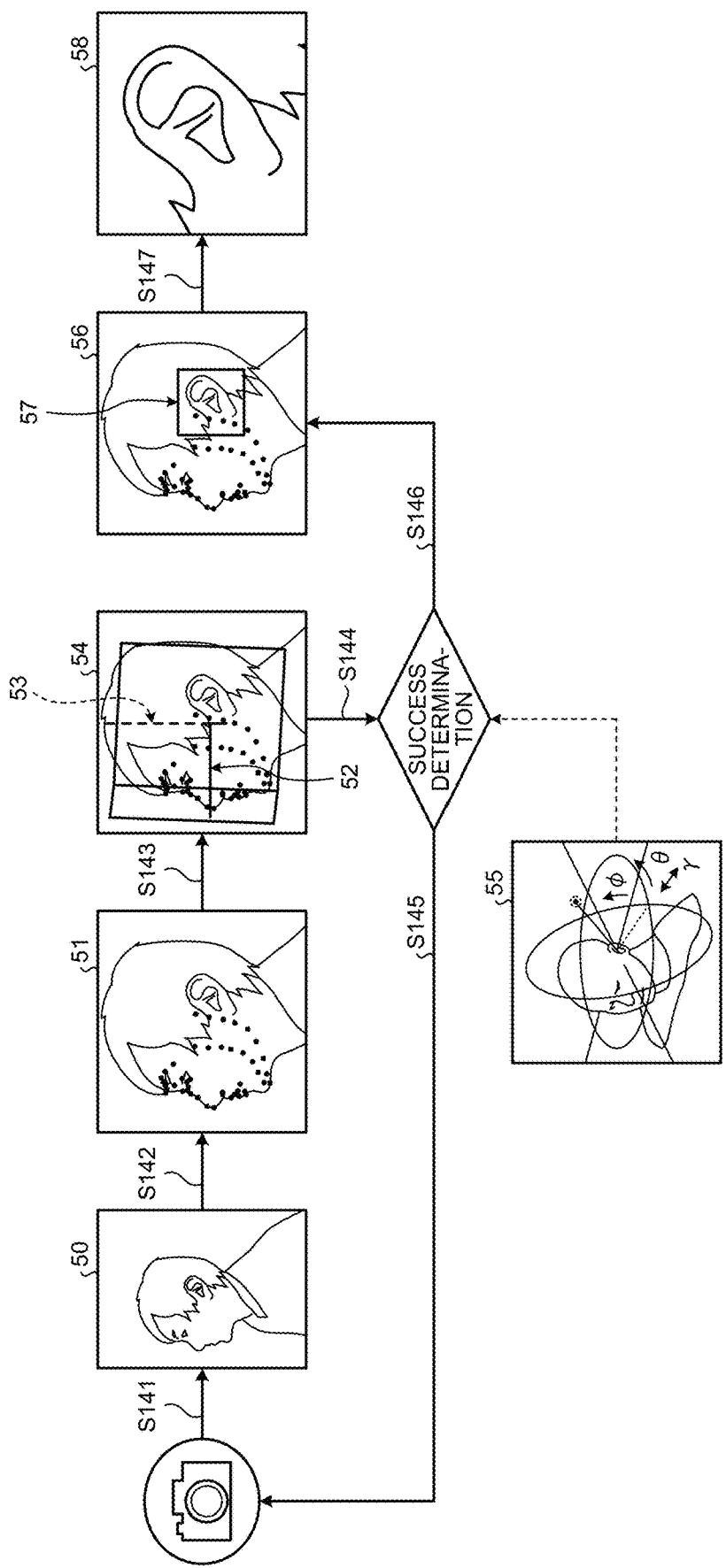
FIG. 15 is a diagram illustrating the process of detection processing according to the present disclosure.

The process of the preprocessing executed by the preprocessing unit 162 (the posture detection unit 163A and the ear detection unit 163B) will be described below with reference to FIG. 15. FIG. 15 is a diagram illustrating the process of detection processing according to the present disclosure.

As illustrated in FIG. 15, when a side face of the user is captured by the user, the acquisition unit 161 acquires an entire image 50 (step S141).

The posture detection unit 163A detects a side face of the user in the entire acquired image 50 (step S142). For example, the posture detection unit 163A specifies a range including a content image of a side face of the user in the entire image 50 by using a known technology such as human face detection processing.

Then, the posture detection unit 163A detects a feature point included in the side face of the user as illustrated with an image 51. For example, the posture detection unit 163A detects, in the side face, feature points such as a place (specifically, the apex of the nose of the user) protruding in the horizontal direction, the apex of the head, the position of the mouth, and the position of the jaw. The posture detection unit 163A also detects, for example, the positions of an ear and a sideburn of the user based on information of the boundary of hair and skin and the like. The posture detection unit 163A also detects the position of an eye of the user or the like based on color information of the content image of the side face.

Then, the posture detection unit 163A detects the posture of the user based on the detected feature points (step S143). For example, the posture detection unit 163A detects the posture of the head of the user based on three-dimensional disposition of the feature points as illustrated with an image 54.

Such posture detection processing is processing to prevent the posture in an ear image transmitted by the user from largely deviating from the posture of a 3D model used at learning. This is because when an image including a posture largely different from that of the 3D model is transmitted from the user terminal 10, the information processing device 100 potentially cannot appropriately perform ear image recognition due to deviation between the learning data and the transmitted ear image.

Thus, the posture detection unit 163A determines whether the difference between the average value of the angle of a head 3D model 55 used in learning through rendering and an angle obtained from the image 54 is equal to or smaller than a predetermined threshold value, thereby performing success determination of whether the user has appropriately performed image capturing (step S144). For example, it is assumed that, in learning of an ear parameter estimation model, an angle $\phi$ between the orientation of a camera at rendering of the head 3D model 55 and a line segment connecting the head apex and a predetermined position of an ear (for example, the entrance of the external ear canal) is equal to or smaller than a predetermined numerical value. Similarly, it is assumed that, in learning of an ear parameter estimation model, an angle $\theta$ between the orientation of the camera and a line segment connecting the apex of the nose and a predetermined position of the ear is equal to or smaller than a predetermined numerical value. This is because an ear image used in learning does not largely deviate from an image illustrating a side face of a human to increase image recognition accuracy. Specifically, the posture detection unit 163A determines whether, similarly to an image in learning, an image transmitted from the user has an angle with which the image is recognizable as an image illustrating a side face of a human.

When having determined that the user has not appropriately performed image capturing (for example, when the nose points downward beyond a predetermined threshold value at the face of the user), the posture detection unit 163A performs processing of, for example, displaying a message that requests execution of image capturing again and then acquires a newly captured image (step S145).

When having determined that the user has appropriately performed image capturing (step S146), the ear detection unit 163B specifies a range 57 including a content image of an ear in an image 56 and cuts out the range 57 (step S147). Accordingly, the ear detection unit 163B acquires an ear image 58.

By performing the detection processing illustrated in FIG. 15, the information processing device 100 can determine whether an ear of the user is tilted due to a poor image capturing state or the angle of the ear is actually tilted, and then perform HRTF calculation.

In addition, the user terminal 10 cuts out an ear image from the entire image of a side face as described above, and thus, not the entire image, in which the face of the user is included, but only the ear image can be transmitted to perform processing. Accordingly, the user terminal 10 can prevent leakage of private information, thereby increasing the security of information processing. Note that the user terminal 10 is not limited to the above-described detection method but may perform processing of cutting out an ear image from the entire image of a side face by detecting an ear of a user included in the image by using an image recognition technology by machine learning or the like.

Description continues with reference to FIG. 14 again. The transmission unit 164 transmits the ear image generated based on the range detected by the ear detection unit 163B to the information processing device 100.

The reception unit 165 receives a personalized HRTF provided by the information processing device 100. For example, the reception unit 165 incorporates the received personalized HRTF into music and voice at a sound playback application or the like, thereby achieving 3D acoustic and the like optimized for an individual user.

2. Second Embodiment

Subsequently, the second embodiment will be described below. The first embodiment describes above an example in which the user terminal 10 generates an ear image by cutting out only a content image of an ear from an image captured by a user. An information processing device 100A according to the second embodiment performs, by the own device in place of the user terminal 10, processing of cutting out only a content image of an ear.

Figure 16:
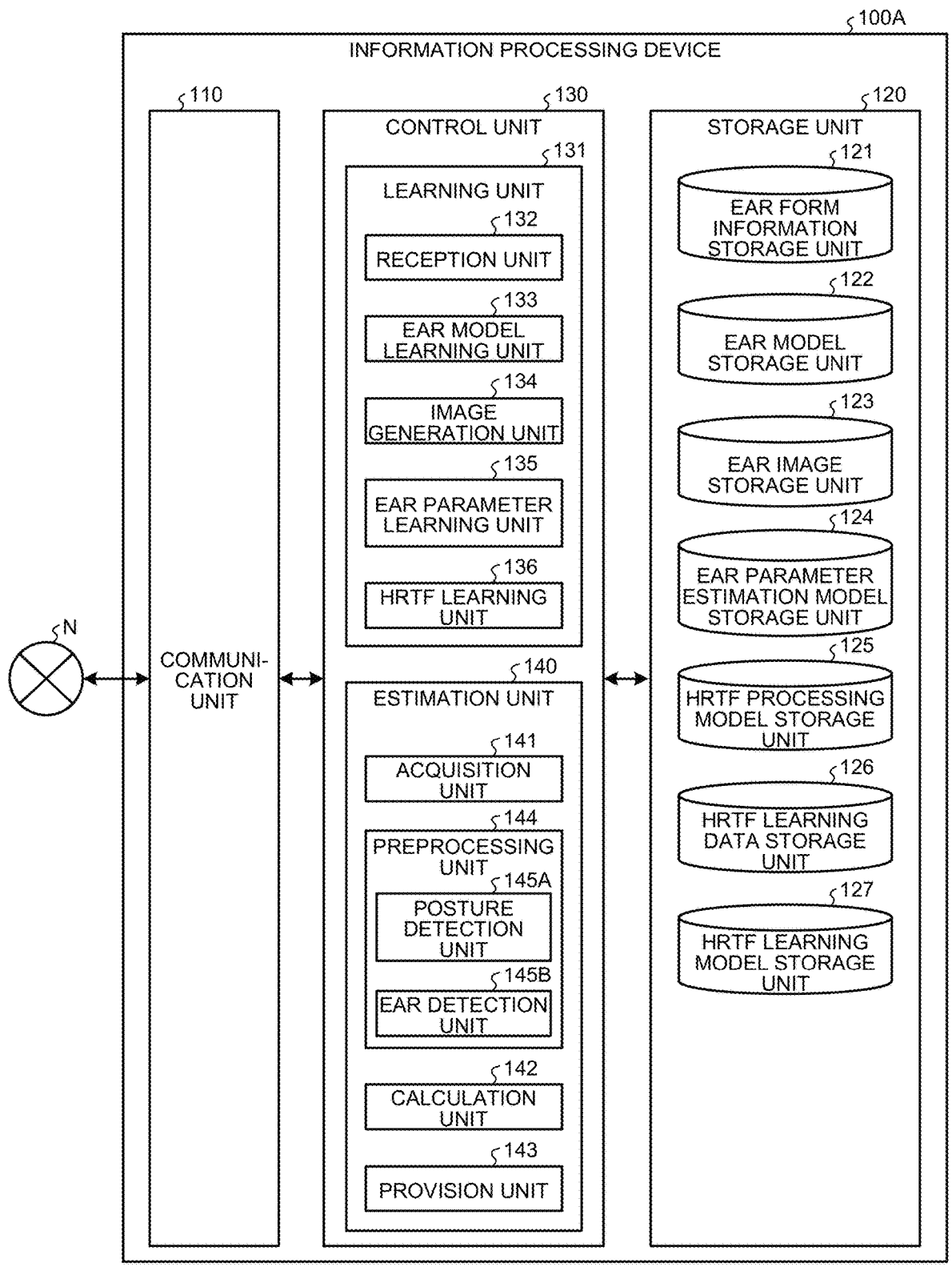
FIG. 16 is a diagram illustrating an exemplary configuration of an information processing device according to a second embodiment of the present disclosure.

The configuration of the information processing device 100A according to the second embodiment will be described below with reference to FIG. 16. FIG. 16 is a diagram illustrating an exemplary configuration of the information processing device 100A according to the second embodiment of the present disclosure. As illustrated in FIG. 16, the information processing device 100A further includes a preprocessing unit 144 (a posture detection unit 145A and an ear detection unit 145B) in addition to the configuration of the first embodiment.

The posture detection unit 145A performs processing same as that performed by the posture detection unit 163A according to the first embodiment. The ear detection unit 145B performs processing same as that performed by the ear detection unit 163B according to the first embodiment. Accordingly, the information processing device 100A according to the second embodiment executes, by the own device, preprocessing executed by the user terminal 10 according to the first embodiment.

In the second embodiment, the acquisition unit 141 acquires the entire image of a side face, which is captured by a user, from the user terminal 10. Then, the posture detection unit 145A and the ear detection unit 145B generate an ear image based on the entire image by performing processing same as the processing described with reference to FIG. 15. The calculation unit 142 calculates a personalized HRTF based on the ear image generated by the posture detection unit 145A and the ear detection unit 145B.

In this manner, with the information processing device 100A according to the second embodiment, the user can receive personalized HRTF provision by only capturing and transmitting an image. In addition, with the configuration of the second embodiment, since the preprocessing does not need to be executed at the user terminal 10, it is possible to reduce, for example, a processing load on the user terminal 10. Moreover, since it can be assumed that, typically, processing speed is higher at the server device (information processing device 100) than the user terminal 10, it is possible to improve the entire speed of the information processing according to the present disclosure with the configuration of the second embodiment. Note that when correction information is transmitted together with the entire image, the posture detection unit 145A and the ear detection unit 145B may specify a content image of an ear of the user by correcting rotation of the entire image based on the correction information included in the entire image and may detect the specified range as an ear image.

3. Other Embodiments

Processing according to the above-described embodiments may be performed in various kinds of different forms other than the above-described embodiments.

Among the pieces of processing described above in the embodiments, all or some pieces of processing described as automatically performed processing may be manually performed, or all or some pieces of processing described as manually performed processing may be automatically performed by a well-known method. In addition, information including processing procedures, specific names, and various kinds of data and parameters, which are indicated in the above-described document and drawings may be optionally changed unless otherwise stated. For example, various kinds of information illustrated in each drawing are not limited to the illustrated information.

Components of devices illustrated in the drawings represent conceptual functions and are not necessarily physically configured as illustrated in the drawings. In other words, specific forms of dispersion and integration of the devices are not limited to the illustrated forms, and all or some of the devices may be functionally or physically dispersed and integrated in optional units in accordance with various burdens and use situations.

The above-described embodiments and modifications may be combined as appropriate without inconsistency of processing contents.

Effects described in the present specification are merely exemplary and not restrictive, but any other effect may be achieved.

4. Hardware Configuration

Figure 17:
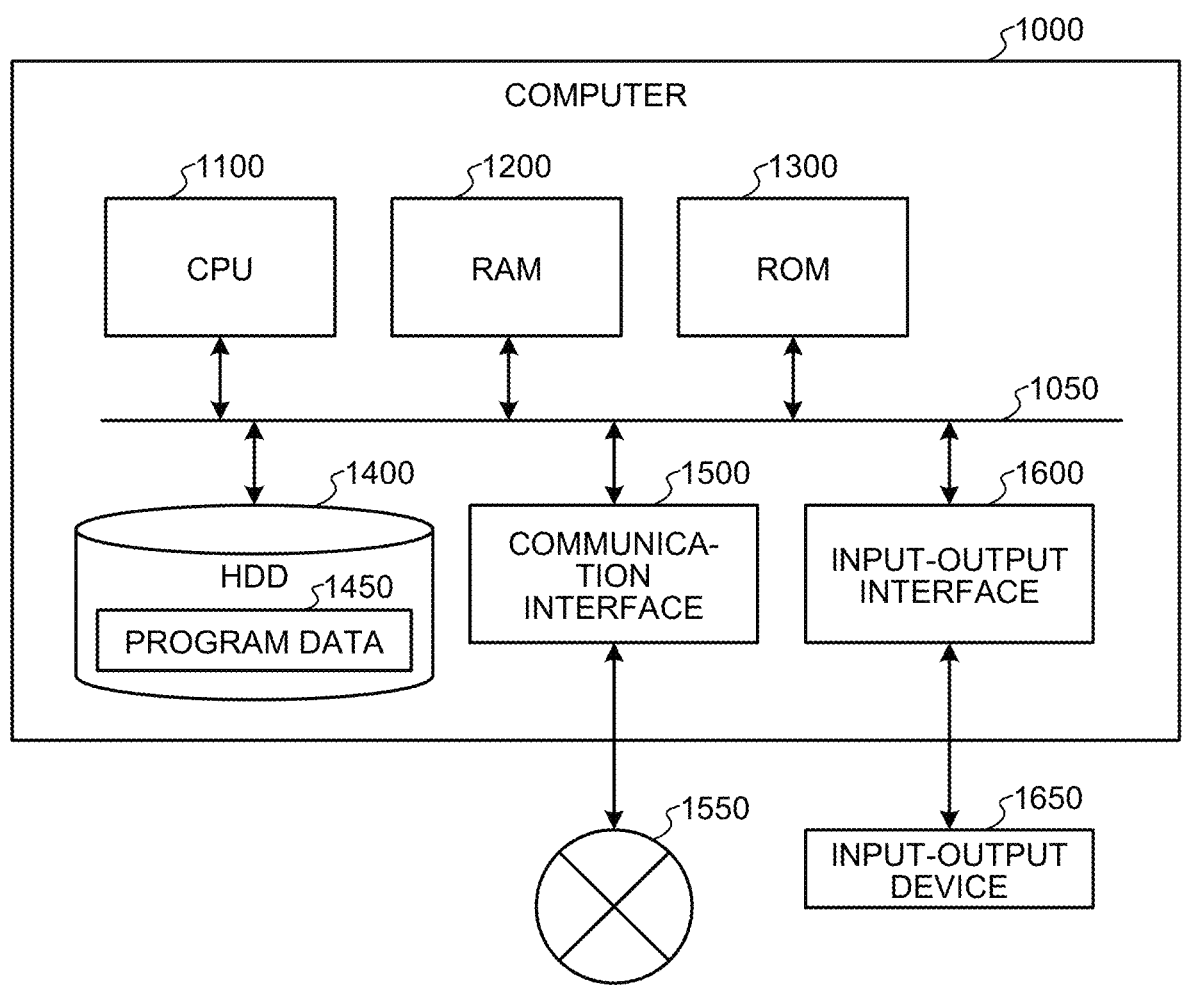
FIG. 17 is a hardware configuration diagram illustrating an exemplary computer configured to achieve functions of each information processing device.

An information instrument such as the information processing device 100 or the user terminal 10 according to each above-described embodiment is achieved by, for example, a computer 1000 having a configuration as illustrated in FIG. 17. The following describes an example with the information processing device 100 according to the first embodiment. FIG. 17 is a hardware configuration diagram illustrating an exemplary computer 1000 configured to achieve functions of the information processing device 100. The computer 1000 includes a CPU 1100, a RAM 1200, a read only memory (ROM) 1300, a hard disk drive (HDD) 1400, a communication interface 1500, and an input-output interface 1600. The components of the computer 1000 are connected with one another through a bus 1050.

The CPU 1100 operates based on a computer program stored in the ROM 1300 or the HDD 1400 and performs control of each component. For example, the CPU 1100 executes processing corresponding to various computer programs by burdening the computer programs stored in the ROM 1300 or the HDD 1400 onto the RAM 1200.

The ROM 1300 stores a boot program such as a basic input/output system (BIOS) executed by the CPU 1100 at activation of the computer 1000, a computer program dependent on hardware of the computer 1000, and the like.

The HDD 1400 is a computer-readable recording medium in which a computer program executed by the CPU 1100, data used by the computer program, and the like are recorded in a non-temporary manner. Specifically, the HDD 1400 is a recording medium that records the information processing program according to the present disclosure, which is exemplary program data 1450.

The communication interface 1500 is an interface for connecting the computer 1000 with an external network 1550 (for example, the Internet). For example, through the communication interface 1500, the CPU 1100 receives data from another instrument and transmits data generated by the CPU 1100 to another instrument.

The input-output interface 1600 is an interface for connecting the computer 1000 with an input-output device 1650. For example, the CPU 1100 receives data from an input device such as a keyboard or a mouse through the input-output interface 1600. The CPU 1100 transmits data to an output device such as a display, a speaker, or a printer through the input-output interface 1600. The input-output interface 1600 may function as a medium interface for reading a computer program or the like recorded in a predetermined recording medium. The medium is, for example, an optical recording medium such as a digital versatile disc (DVD) or a phase change rewritable disk (PD), a magneto-optical recording medium such as a magneto-optical disk (MO), a tape medium, a magnetic recording medium, or a semiconductor memory.

For example, when the computer 1000 functions as the information processing device 100 according to the first embodiment, the CPU 1100 of the computer 1000 achieves the function of the control unit 130 or the like by executing an information processing program loaded onto the RAM 1200. The HDD 1400 stores the information processing program according to the present disclosure and data in the storage unit 120. Note that the CPU 1100 reads the program data 1450 from the HDD 1400 and executes the program data 1450, but for example, may acquire these computer programs from another device through the external network 1550.

Note that the present technology may be configured as described below.

(1)

An information processing device comprising:

an acquisition unit configured to acquire a first image including a content image of an ear of a user; and a calculation unit configured to calculate, based on the first image acquired by the acquisition unit, a head-related transfer function corresponding to the user by using a learned model having learned to output a head-related transfer function corresponding to an ear when an image including a content image of the ear is input.

(2)

The information processing device according to (1), wherein the acquisition unit acquires an ear parameter that is a variable representing a characteristic of the ear included in the first image, and the calculation unit calculates the head-related transfer function corresponding to the user by inputting the ear parameter to the learned model.

(3)

The information processing device according to (2), wherein the acquisition unit acquires the ear parameter of the ear included in the first image by using an ear parameter estimation model having learned to output an ear parameter corresponding to an ear when an image including a content image of the ear is input.

(4)

The information processing device according to (3), further comprising a first learning unit configured to generate the ear parameter estimation model by learning a relation between an image including a content image of an ear and an ear parameter of the ear.

(5)

The information processing device according to (4), wherein the first learning unit generates the ear parameter estimation model by learning a relation between the ear parameter and an ear image obtained by rendering three-dimensional data of the ear generated based on the ear parameter.

(6)

The information processing device according to (5), wherein the first learning unit generates the ear parameter estimation model by learning a relation between a plurality of ear images obtained by changing texture of three-dimensional data of the ear or a head, a camera angle in rendering, or luminance in rendering and an ear parameter common to the ear images.

(7)

The information processing device according to any one of (1) to (6), further comprising a second learning unit configured to generate the learned model by learning a relation between an image including a content image of an ear and a head-related transfer function corresponding to the ear.

(8)

The information processing device according to (7), wherein the second learning unit performs acoustic simulation for three-dimensional data obtained by synthesizing three-dimensional data of the ear generated based on the ear parameter and three-dimensional data of a head, and generates the learned model by learning a relation between a head-related transfer function obtained through the acoustic simulation and the ear parameter.

(9)

The information processing device according to (8), wherein the second learning unit compresses an information amount of the head-related transfer function obtained through the acoustic simulation, and generates the learned model by learning a relation between the compressed head-related transfer function and the ear parameter.

(10)

The information processing device according to (8) or (9), wherein the second learning unit sets a hearing point of three-dimensional data of the ear generated based on the ear parameter, and performs the acoustic simulation by using the set hearing point.

(11)

The information processing device according to any one of (1) to (10), further comprising a preprocessing unit configured to specify a content image of an ear of the user in a second image including a content image of the entire head of the user, and detect a specified range as the first image, wherein the acquisition unit acquires the first image detected by the preprocessing unit.

(12)

The information processing device according to (11), wherein the preprocessing unit specifies the range based on a relation between a feature point of the head of the user included in the second image and a posture of the user.

(13)

The information processing device according to (12), wherein when the range cannot be specified based on the relation between the feature point of the head of the user included in the second image and the posture of the user, the preprocessing unit newly requests acquisition of an image different from the second image and including a content image of the entire head of the user.

(14)

The information processing device according to any one of (11) to (13), wherein the preprocessing unit specifies a content image of an ear of the user by correcting rotation of the second image based on correction information included in the second image, and detects a specified range as the first image.

(15)

An information processing method by which a computer performs:

acquiring a first image including a content image of an ear of a user; and calculating, based on the acquired first image, a head-related transfer function corresponding to the user by using a learned model having learned to output a head-related transfer function corresponding to an ear when an image including a content image of the ear is input.

(16)

An information processing program configured to cause a computer to function as:

an acquisition unit configured to acquire a first image including a content image of an ear of a user; and a calculation unit configured to calculate, based on the first image acquired by the acquisition unit, a head-related transfer function corresponding to the user by using a learned model having learned to output a head-related transfer function corresponding to an ear when an image including a content image of the ear is input.

(17) An information processing system including an information processing device and a user terminal, wherein
the user terminal includes
a preprocessing unit configured to specify a content image of an ear of a user in a second image including a content image of the entire head of the user and detect a specified range as a first image, and
a transmission unit configured to transmit the first image detected by the preprocessing unit to the information processing device, and
the processing device includes
an acquisition unit configured to acquire the first image including a content image of an ear of the user, and
a calculation unit configured to calculate, based on the first image acquired by the acquisition unit, a head-related transfer function corresponding to the user by using a learned model having learned to output a head-related transfer function corresponding to an ear when an image including a content image of the ear is input.

REFERENCE SIGNS LIST 1 information processing system
10 user terminal
100 information processing device
110 communication unit
120 storage unit
130 control unit
131 learning unit
132 reception unit
133 ear model learning unit
134 image generation unit
135 ear parameter learning unit
136 HRTF learning unit
140 estimation unit
141 acquisition unit
142 calculation unit
143 provision unit
144 preprocessing unit
145A posture detection unit
145B ear detection unit
161 acquisition unit
162 preprocessing unit
163A posture detection unit
163B ear detection unit
164 transmission unit
165 reception unit

The invention claimed is:

1. An information processing device comprising:
circuitry configured to function as:
an acquisition unit configured to acquire a first image including a content image of an ear of a user;
a calculation unit configured to calculate, based on the first image acquired by the acquisition unit, a head-related transfer function corresponding to the user by using a learned model having learned to output a head-related transfer function corresponding to an ear when an image including a content image of the ear is input; and
a first learning unit configured to generate an ear parameter estimation model by learning a relation between a plurality of ear images obtained by changing:
texture of three-dimensional data of the ear or a head, or luminance in rendering, and
an ear parameter common to the ear images,
wherein the texture includes a skin color of the ear or of the head.

2. The information processing device according to claim 1, wherein
the acquisition unit acquires an ear parameter that is a variable representing a characteristic of the ear included in the first image, and
the calculation unit calculates the head-related transfer function corresponding to the user by inputting the ear parameter to the learned model.

3. The information processing device according to claim 2, wherein the acquisition unit acquires the ear parameter of the ear included in the first image by using an ear parameter estimation model having learned to output an ear parameter corresponding to an ear when an image including a content image of the ear is input.

4. The information processing device according to claim 3, wherein the first learning unit is configured to generate the ear parameter estimation model by learning a relation between an image including a content image of an ear and an ear parameter of the ear.

5. The information processing device according to claim 4, wherein the first learning unit generates the ear parameter estimation model by learning a relation between the ear parameter and an ear image obtained by rendering three-dimensional data of the ear generated based on the ear parameter.

6. The information processing device according to claim 5, wherein the first learning unit generates the ear parameter estimation model by learning the relation between the plurality of ear images obtained by changing a camera angle in rendering.

7. The information processing device according to claim 4, further comprising a second learning unit configured to generate the learned model by learning a relation between an image including a content image of an ear and a head-related transfer function corresponding to the ear.

8. The information processing device according to claim 7, wherein the second learning unit performs acoustic simulation for three-dimensional data obtained by synthesizing three-dimensional data of the ear generated based on the ear parameter and three-dimensional data of a head, and generates the learned model by learning a relation between a head-related transfer function obtained through the acoustic simulation and the ear parameter.

9. The information processing device according to claim 8, wherein the second learning unit compresses an information amount of the head-related transfer function obtained through the acoustic simulation, and generates the learned model by learning a relation between the compressed head-related transfer function and the ear parameter.

10. The information processing device according to claim 8, wherein the second learning unit sets a hearing point of three-dimensional data of the ear generated based on the ear parameter, and performs the acoustic simulation by using the set hearing point.

11. The information processing device according to claim 1, further comprising a preprocessing unit configured to specify a content image of an ear of the user in a second image including a content image of the entire head of the user, and detect a specified range as the first image, wherein the acquisition unit acquires the first image detected by the preprocessing unit.

12. The information processing device according to claim 11, wherein the preprocessing unit specifies the range based on a relation between a feature point of the head of the user included in the second image and a posture of the user.

13. The information processing device according to claim 12, wherein when the range cannot be specified based on the relation between the feature point of the head of the user included in the second image and the posture of the user, the preprocessing unit newly requests acquisition of an image different from the second image and including a content image of the entire head of the user.

14. The information processing device according to claim 11, wherein the preprocessing unit specifies a content image of an ear of the user by correcting rotation of the second image based on correction information included in the second image, and detects a specified range as the first image.

15. An information processing method by which a computer performs:

acquiring a first image including a content image of an ear of a user;

calculating, based on the acquired first image, a head-related transfer function corresponding to the user by using a learned model having learned to output a head-related transfer function corresponding to an ear when an image including a content image of the ear is input; and generating an ear parameter estimation model by learning a relation between a plurality of ear images obtained by changing:
  texture of three-dimensional data of the ear or a head, or luminance in rendering, and
  an ear parameter common to the ear images,
  wherein the texture includes a skin color of the ear or of the head.

16. A non-transitory computer-readable storage medium encoded with executable instructions that, when executed by at least one processor, cause the at least one processor to perform:

acquiring a first image including a content image of an ear of a user;

calculating, based on the first image acquired, a head-related transfer function corresponding to the user by using a learned model having learned to output a head-related transfer function corresponding to an ear when an image including a content image of the ear is input; and generating an ear parameter estimation model by learning a relation between a plurality of ear images obtained by changing:
  texture of three-dimensional data of the ear or a head, or luminance in rendering, and
  an ear parameter common to the ear images,
  wherein the texture includes a skin color of the ear or of the head.

* * * * *